US010072864B2

(12) United States Patent
Abe et al.

(10) Patent No.: US 10,072,864 B2
(45) Date of Patent: Sep. 11, 2018

(54) CONTROL APPARATUS AND PROGRAM

(71) Applicant: Panasonic Corporation, Osaka (JP)

(72) Inventors: Yuka Abe, Osaka (JP); Atsushi Mise, Aichi (JP)

(73) Assignee: Panasonic Corporation (*) Notice: Subject to any disclaimer, the term of this patent is extended or adjusted under 35 U.S.C. 154(b) by 278 days.

(21) Appl. No.: 14/429,721

(22) PCT Filed: Sep. 19, 2013

(86) PCT No.: PCT/JP2013/005532
§ 371 (c)(1),
(2) Date: Mar. 19, 2015

(87) PCT Pub. No.: WO2014/064883
PCT Pub. Date: May 1, 2014

(65) Prior Publication Data
US 2015/0233594 A1 Aug. 20, 2015

(30) Foreign Application Priority Data
Oct. 24, 2012 (JP) .................. 2012-235075

(51) Int. Cl.
F24F 11/30 (2018.01)
G05B 15/02 (2006.01)
F24F 11/62 (2018.01)

(52) U.S. Cl.
CPC .............. F24F 11/30 (2018.01); F24F 11/62 (2018.01); G05B 15/02 (2013.01)

(58) Field of Classification Search
CPC ............................... F24F 11/006; G05B 15/02
See application file for complete search history.

(56) References Cited

U.S. PATENT DOCUMENTS 8,723,344 B1* 5/2014 Dierickx ............. F03G 7/08
290/1 R
2009/0013703 A1* 1/2009 Werner ............. F24F 5/0046
62/180

(Continued)

FOREIGN PATENT DOCUMENTS

JP 59-189244 A 10/1984
JP 04-306441 A 10/1992

(Continued)

OTHER PUBLICATIONS

Machine translation of JP2009-144435, Nakayama Masaaki, Opening and closing window system interlocked with air conditioner, Jul. 2, 2009, 6 page.*

(Continued)

Primary Examiner — Thomas C Lee
Assistant Examiner — Tri T Nguyen
(74) Attorney, Agent, or Firm — Renner, Otto, Boisselle & Skalr, LLP

(57) ABSTRACT

A comparison unit compares the outside air temperature in outside air temperature information acquired by an outside air temperature acquisition unit with an outside air temperature threshold that has been set by a threshold setting unit. A first information acquisition unit acquires ON operation information. A device control unit performs passive control when the outside air temperature is in a temperature range on a comfortable side with respect to the outside air temperature threshold. Where the outside air temperature is in a temperature range on an uncomfortable side with respect to the outside air temperature threshold, the device control unit performs passive control until an ON operation is performed and performs active control once the ON operation is performed. The passive control involves performing OFF control of the active device and natural environment usage (Continued)

control of a passive device. The active control involves performing ON control of the active device.

20 Claims, 15 Drawing Sheets

(56) References Cited

U.S. PATENT DOCUMENTS

| | | | | |
|---|---|---|---|---|
| 2010/0211224 | A1* | 8/2010 | Keeling | F24D 19/1066 700/277 |
| 2010/0332034 | A1* | 12/2010 | Bergeson | E06B 7/08 700/275 |
| 2013/0085613 | A1* | 4/2013 | Bester | F24F 11/0001 700/277 |

FOREIGN PATENT DOCUMENTS

| | | |
|---|---|---|
| JP | 2000-304329 A | 11/2000 |
| JP | 2001-343145 A | 12/2001 |
| JP | 2010-236763 A | 10/2010 |
| JP | 2001-027435 A | 1/2011 |

OTHER PUBLICATIONS

Mr. Money Mustache, How not to use your air conditioning, Jul. 18, 2011, 28 pages.*
Green Garage Detroit, Sustainable window design, Jun. 27, 2009, 4 pages.*
Spark energy, How insulated curtains can help you save energy, Jan. 11, 2012, 6 pages.*
International Search Report for corresponding International Application No. PCT/JP2013/005532 dated Oct. 29, 2013.
Form PCT/ISA/237 for corresponding International Application No. PCT/JP2013/005532 dated Oct. 29, 2013.

* cited by examiner

FIG. 2

| | | | ACTIVE DEVICE | PASSIVE CONTROL | | | |
|---|---|---|---|---|---|---|---|
| | | | | CEILING FAN | LARGE WINDOW | SMALL WINDOW | EXTERNAL LIGHT SHIELDING DEVICE |
| SUMMERTIME (JUNE-SEPTEMBER) | ACTIVE CONTROL | OUTSIDE AIR TEMPERATURE≧27°C | ON | OFF | CLOSE | CLOSE | CLOSE |
| | PASSIVE CONTROL | OUTSIDE AIR TEMPERATURE<27°C | OFF | ON | OPEN | OPEN | OPEN |
| WINTERTIME (DECEMBER-MARCH) | ACTIVE CONTROL | OUTSIDE AIR TEMPERATURE≦8°C | ON | OFF | CLOSE | CLOSE | OPEN |
| | PASSIVE CONTROL | OUTSIDE AIR TEMPERATURE>8°C | OFF | OFF | CLOSE | CLOSE | OPEN |

FIG. 3

| | | | | Thermal Insulation Evaluation Value | Light Utilization Evaluation Value | Ventilation Evaluation Value |
|---|---|---|---|---|---|---|
| HOUSE | Q VALUE | | | ● | | |
| | C VALUE | | | ● | | |
| | DISTANCE TO NEIGHBORING HOUSE (SQUARE TOTAL) | | | | ● | ● |
| | OPEN SPACE RATIO | | | | | ● |
| | MAIN LOCATION ORIENTATION | | | | ● | |
| | LATITUDE OF LOCATION | | | | ● | |
| | PASSIVE DEVICES IN HOUSE | CEILING FAN | VENTILATION FREQUENCY | | | ● |
| | | | POSITION | | | ● |
| | | AUTOMATIC WINDOW (OPENING) | SURFACE AREA RATIO TO OUTER WALL | ● | | ● |
| | | | RATIO OF SOUTH-FACING AUTOMATIC WINDOW | | ● | |
| | | | MUTUAL ARRANGEMENT | | ● | |
| | | SHUTTER, BLIND, CURTAIN | SURFACE AREA RATIO TO OUTER WALL | ● | | |
| | | | THERMAL CONDUCTIVITY (MATERIAL) | ● | | |
| ROOMS | ORIENTATION IN CONTACT WITH OTHER ROOMS | | | ● | | |
| | FLOOR | | | ● | | |
| | PASSIVE DEVICES IN ROOM | AUTOMATIC WINDOW (OPENING) | SURFACE AREA RATIO TO OUTER WALL | ● | ● | ● |
| | | | RATIO OF SOUTH-FACING AUTOMATIC WINDOW | | ● | |
| | | | MUTUAL ARRANGEMENT | | | ● |
| | | SHUTTER, BLIND, CURTAIN | SURFACE AREA RATIO TO OUTER WALL | ● | | |
| | | | THERMAL CONDUCTIVITY (MATERIAL) | ● | | |

FIG. 4

| | | THERMAL INSULATION EVALUATION VALUE | LIGHT UTILIZATION EVALUATION VALUE | VENTILATION EVALUATION VALUE |
|---|---|---|---|---|
| Q VALUE | LESS THAN 1.9 | +5 | | |
| | EQUAL TO OR GREATER THAN 1.9 LESS THAN 2.4 | +3 | | |
| | EQUAL TO OR GREATER THAN 2.4 LESS THAN 2.7 | +1 | | |
| | EQUAL TO OR GREATER THAN 2.7 | 0 | | |
| C VALUE | LESS THAN 2 | +5 | | |
| | EQUAL TO OR GREATER THAN 2 LESS THAN 5 | +3 | | |
| | EQUAL TO OR GREATER THAN 5 | 0 | | |
| DISTANCE TO NEIGHBORING HOUSE (SQUARE TOTAL) | EQUAL TO OR GREATER THAN 50m | | +2 | +3 |
| | EQUAL TO OR GREATER THAN 25m LESS THAN 50m | | +2 | +2 |
| | EQUAL TO OR GREATER THAN 10m LESS THAN 25m | | +1 | +1 |
| | LESS THAN 10m | | 0 | 0 |
| OPEN SPACE (INTEGRATED SPACE SUCH AS LDK, CORRIDOR, STAIRCASE) RATIO | EQUAL TO OR GREATER THAN 50% | | | +3 |
| | EQUAL TO OR GREATER THAN 30% LESS THAN 50% | | | +1 |
| | LESS THAN 30% | | | 0 |
| ... | ... | ... | ... | ... |
| SURFACE AREA RATIO OF OPENING TO OUTER WALLS | EQUAL TO OR GREATER THAN 50% | | +5 | +5 |
| | EQUAL TO OR GREATER THAN 40% LESS THAN 50% | | +3 | +3 |
| | EQUAL TO OR GREATER THAN 30% LESS THAN 40% | | +1 | +1 |
| | LESS THAN 30% | | 0 | 0 |

FIG. 9

| | | | Active Device | Passive Control | | | |
| --- | --- | --- | --- | --- | --- | --- | --- |
| | | | | Ceiling Fan | Large Window | Small Window | External Light Shielding Device |
| SUMMERTIME (JUNE-SEPTEMBER) | ACTIVE CONTROL | OUTSIDE AIR TEMPERATURE ≧27°C | ON | OFF | CLOSE | CLOSE | CLOSE |
| | PASSIVE CONTROL | OUTSIDE AIR TEMPERATURE <27°C | OFF | ON | CLOSE | OPEN | CLOSE |
| WINTERTIME (DECEMBER-MARCH) | ACTIVE CONTROL | OUTSIDE AIR TEMPERATURE ≦8°C | ON | OFF | CLOSE | CLOSE | CLOSE |
| | PASSIVE CONTROL | OUTSIDE AIR TEMPERATURE >8°C | OFF | OFF | CLOSE | CLOSE | CLOSE |

CONTROL APPARATUS AND PROGRAM

TECHNICAL FIELD

The present invention relates to a control apparatus and a program that control an active device and a passive device that change a room temperature in a target space inside a building.

BACKGROUND ART

A control apparatus for controlling an active device that cools or warms the air inside a target space of a building, such as a house unit, in order to obtain comfortable environment in the target space, and a passive device that introduces outside air into the target space has been known (see, for example, JP 59-189244 A (referred to hereinbelow as "document 1")).

The apparatus described in document 1 controls a compressor and performs a cooling operation when the outside air temperature is higher than a set value, and controls a damper and a fan and introduces the outside air into the room when the outside air temperature is lower than the set value.

However, the conventional control apparatus described in document 1 directly performs the cooling operation when the outside air temperature becomes higher than the set value. In other words, the conventional control apparatus performs the cooling operation regardless of whether or not a person in the target space needs the cooling operation. Therefore, with the conventional control apparatus, energy is sometimes unnecessarily consumed.

SUMMARY OF INVENTION

The present invention has been created with the foregoing in view, and it is an objective of the present invention to provide a control apparatus and a program that can realize energy savings while ensuring comfort for people in a target space.

A control apparatus in accordance with the present invention is configured to control an active device and a passive device which change a room temperature in a target space inside a building. The control apparatus includes: an outside air temperature acquisition unit configured to acquire outside air temperature information indicating an outside air temperature outside the building; a threshold setting unit configured to set an outside air temperature threshold; a comparison unit configured to compare the outside air temperature in the outside air temperature information acquired by the outside air temperature acquisition unit with the outside air temperature threshold that has been set by the threshold setting unit; a device control unit configured to selectively perform, on the basis of a comparison result of the comparison unit, first control by which OFF control is performed on the active device and natural environment usage control which changes the room temperature by using at least one of outside air and external light is performed on the passive device, or second control by which ON control is performed on the active device; and an operation information acquisition unit configured to acquire ON operation information indicating that an ON operation for setting ON the active device has been performed, wherein the device control unit is configured to perform the first control when the outside air temperature is within a temperature range on a comfortable side with respect to the outside air temperature threshold, and perform the first control until the ON operation information is acquired by the operation information acquisition unit and perform the second control upon acquisition of the ON operation information by the operation information acquisition unit when the outside air temperature is in a temperature range on an uncomfortable side with respect to the outside air temperature threshold.

In the control apparatus, it is preferred that the threshold setting unit be configured to set the outside air temperature threshold on the basis of an environment evaluation value including at least one of a thermal insulation evaluation value, a light utilization evaluation value, and a ventilation evaluation value relating to the building.

In the control apparatus, it is preferred that the threshold setting unit be configured to determine the environment evaluation value by using at least one of a heat loss coefficient and an equivalent gap surface area of the building, and set the outside air temperature threshold on the basis of the environment evaluation value.

In the control apparatus, it is preferred that the threshold setting unit be configured to determine the environment evaluation value by using a ratio of a surface area of an opening to a surface area of an outer wall in the building, and set the outside air temperature threshold on the basis of the environment evaluation value.

In the control apparatus, it is preferred that, when the outside air temperature reaches the temperature range on the comfortable side with respect to the outside air temperature threshold while the second control is performed, the device control unit be configured to switch from the second control to the first control with a time delay determined according to the environment evaluation value.

In the control apparatus, it is preferred that, when the ON operation is performed while the first control is performed, the device control unit be configured to switch from the first control to the second control, and return to the first control after a predetermined time elapses since the second control has been started.

In the control apparatus, it is preferred that the threshold setting unit be configured to reset the outside air temperature threshold to a temperature on a comfortable side when the ON operation is performed a first specified number of times or more, in a first predetermined period of time while the first control is performed.

In the control apparatus, it is preferred that the passive device be an automatic window and an external light shielding device installed in an opening of the building; and the device control unit be configured to perform opening control on the automatic window and the external light shielding device when a person is present in the target space, but perform closing control on the automatic window and the external light shielding device when a person is not present in the target space, while the first control is performed.

In the control apparatus, it is preferred that the passive device be an external light shielding device installed in an opening of the building, and the device control unit be configured to perform opening-closing control corresponding to a time slot on the external light shielding device in wintertime.

In the control apparatus, it is preferred that when the passive device performs an operation, which is different from control contents of the first control, a second specified number of times or more, within a second predetermined period of time while the first control is performed, the device control unit be configured to stop control of the passive device with the control contents in a time slot in which the different operation has been performed.

In the control apparatus, it is preferred that when the passive device performs an operation, which is different from control contents of the first control, while the first control is performed, the device control unit be configured to perform return control for returning to the operation with the control contents after a return time elapses since the different operation has been performed, and when the passive device performs the different operation a third specified number of times or more, within a third predetermined period of time, the device control unit be configured to set the return time such as to include a time slot in which the different operation has been performed.

In the control apparatus, it is preferred that the active device be configured to change the room temperature in the target space by cooling or warming air inside the target space by using energy, and the passive device be configured to change the room temperature in the target space by using at least one of outside air and external light.

In the control apparatus, the active device preferably is configured to change the room temperature by cooling or warming the air inside the target space such that the room temperature becomes a set temperature.

A program in accordance with the present invention causes a computer to control an active device and a passive device which change a room temperature in a target space inside a building, the program causing the computer to function as: an outside air temperature acquisition unit configured to acquire outside air temperature information indicating an outside air temperature outside the building; a threshold setting unit configured to set an outside air temperature threshold; a comparison unit configured to compare the outside air temperature in the outside air temperature information acquired by the outside air temperature acquisition unit with the outside air temperature threshold that has been set by the threshold setting unit; an operation information acquisition unit configured to acquire ON operation information indicating that an ON operation for setting ON the active device has been performed; and a device control unit that has a function of selectively performing, on the basis of a comparison result of the comparison unit, first control by which OFF control is performed on the active device and natural environment usage control which changes the room temperature by using at least one of outside air and external light is performed on the passive device, or second control by which ON control is performed on the active device, the device control unit being configured to perform the first control when the outside air temperature is within a temperature range on a comfortable side with respect to the outside air temperature threshold, and perform the first control until the ON operation information is acquired by the operation information acquisition unit and perform the second control upon acquisition of the ON operation information by the operation information acquisition unit when the outside air temperature is in a temperature range on an uncomfortable side with respect to the outside air temperature threshold. The present invention is not limited to a program and may be a computer-readable recording medium where the program is recorded.

In accordance with the present invention, the waste (excessive use) of energy can be reduced by comparison with the case in which the ON control of the active device is performed immediately once the outside air temperature gets into a temperature range on the uncomfortable side with respect to the outside air temperature threshold. As a result, energy savings can be realized while ensuring comfort for people in the target space.

BRIEF DESCRIPTION OF DRAWINGS

FIG. 2 illustrates active control and passive control performed in the control apparatus according to Embodiment 1.

FIG. 3 depicts an environment evaluation value determination table used in the control apparatus according to Embodiment 1.

FIG. 4 is a diagram to be used when determining an environment evaluation value to be used in the control apparatus according to Embodiment 1.

FIG. 9 illustrates active control and passive control performed in the control apparatus according to a variation example of Embodiment 1.

DESCRIPTION OF EMBODIMENTS

The control apparatuses according to the below-described Embodiments 1 to 8 control an active device and a passive device which change the room temperature of the target space inside a building. The control apparatus performs passive control (first control) when the outside air temperature is in a temperature range on a comfortable side with respect to the outside air temperature threshold (referred to hereinbelow as "threshold"). Meanwhile, where the outside air temperature is in a temperature range on an uncomfortable side with respect to the threshold, the control apparatus performs passive control until an ON operation for setting ON an active device 1 is performed and performs active control (second control) once the ON operation is performed.

In the passive control, OFF control is performed on the active device and natural environment usage control is performed on the passive device. In the active control, ON control is performed on the active device. The natural environment usage control changes the room temperature in the target space by using at least either one (natural environment) of outside air and external light.

The case in which the outside air temperature is in a temperature range at a comfortable side with respect to a threshold is assumed to be the case in which the outside air temperature is less than the threshold in the summertime and the case in which the outside air temperature is higher than the threshold in the wintertime. Meanwhile, the case in which the outside air temperature is in a temperature range at an uncomfortable side with respect to a threshold is assumed to be the case in which the outside air temperature is equal to or higher than the threshold in the summertime and the case in which the outside air temperature is equal to or lower than the threshold in the wintertime.

In follows from the above, that the control apparatus performs OFF control on the active device when the outside air temperature is in a temperature range on a comfortable side with respect to the threshold and performs ON control on the active device only when an ON operation relating to the active device has been performed when the outside air temperature is in a temperature range on an uncomfortable side.

Embodiments 1 to 7 will be explained hereinbelow with reference to the drawings.

Embodiment 1

Figure 1:
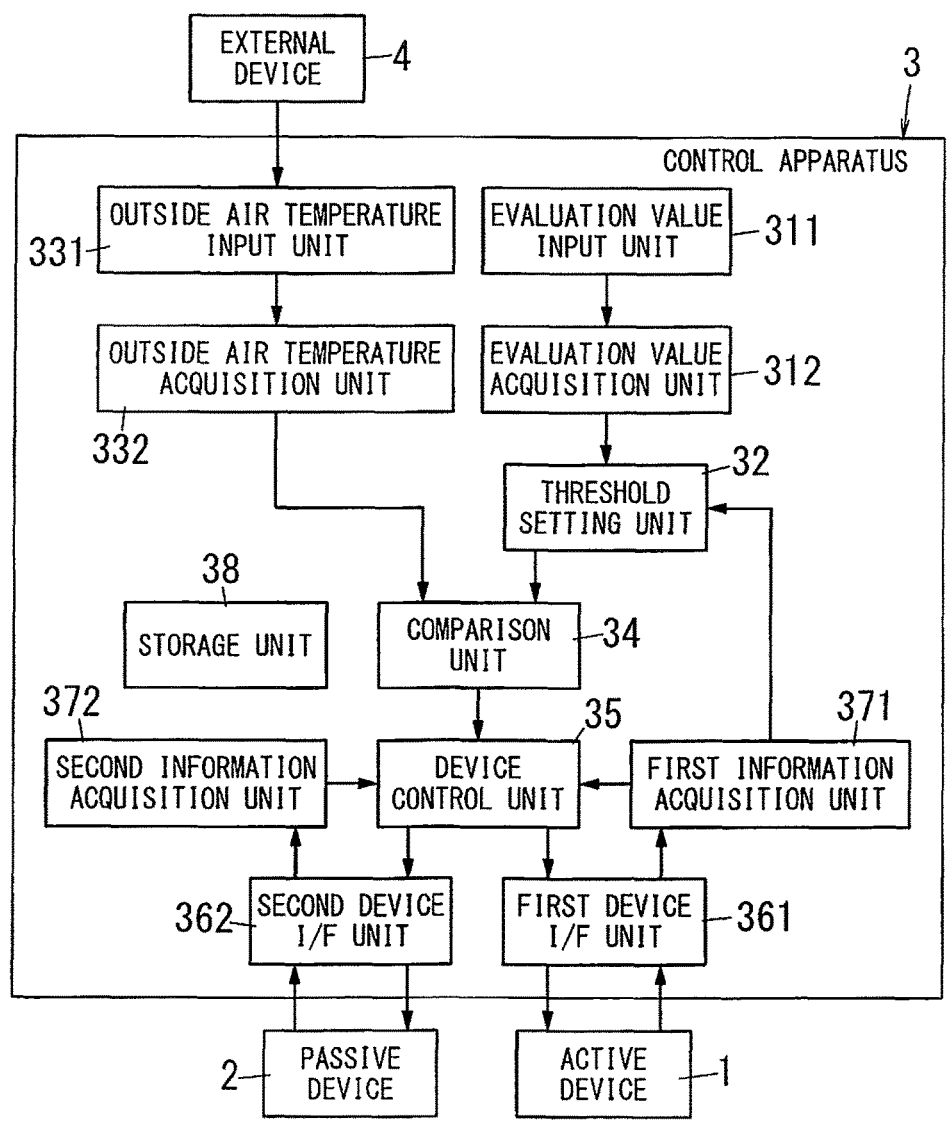
FIG. 1 is a block diagram illustrating the configuration of the control apparatus according to Embodiment 1.

An air conditioning system according to Embodiment 1 is provided with the active device 1, a passive device 2, and a control apparatus 3, as depicted in FIG. 1.

The active device 1 is, for example, an air conditioner, an electric fan heater, an electric stove, a gas fan heater, or a gas stove, and the active device changes the room temperature in a target space by cooling or warming the air in the target space of a building. It is preferred that the active device 1 change the room temperature in the target space by cooling or warming the air in the target space in the building by using energy such as electricity or gas. It is also preferred that the active device 1 be a device that changes the room temperature by cooling or warming the air in the target space such that the room temperature in the target space in the building becomes a set temperature, for example, such as an air conditioner, an electric fan heater, or a gas fan heater. It is further preferred that the active device 1 be a device that changes the room temperature in the target space by a function of consuming energy and transferring heat, for example, such as an air conditioner using a heat pump. The operation of the active device 1 is controlled by the control apparatus 3. The active device 1 is provided with an operation unit (not shown in the figure) that receives an ON operation and an OFF operation from a user. The ON operation is for setting ON the active device 1. The OFF operation is for setting OFF the active device 1. The active device 1 operates according to the operation performed by the operation unit. The operation unit of the active device 1 may be a combination of a remote control device that transmits a signal in response to a user's operation and a signal receiving unit that receives the signal from the remote control device. As mentioned hereinabove, it is preferred that the energy to be used by the active device 1 be, for example, electricity or gas, and outside air or external light are not included. In other words, the energy to be used by the active device 1 is provided with a supply path from a supply company to the building.

The passive device 2 is a room temperature adjusting device that changes the room temperature in the target space by using at least one of outside air and external light. Thus, the passive device 2 is an air circulation device that changes the room temperature in the target space by controlling the transfer of heat caused by at least one of outside air and external light. Examples of the passive device 2 include a device causing circulation of air inside the target space by using electric power, an outside air device that introduces the outside air into the target space or blocks the outside air from the target space by using electric power, and an external light device that introduces external light into the target space or shields the target space from the external light by using electric power. A ceiling fan is an example of the air circulation device. An automatic window (power window) is an example of the outside air device. The automatic window is disposed in a window (opening) of a building and can be opened and closed by electric power. The automatic windows can be classified into large windows allowed a person to enter/exit therethrough, and small windows such that a person cannot enter/exit therethrough. An external light shielding device is an example of the external light device. The external light shielding device is disposed in a window (opening) of a building. The external light shielding device is a device, such as a shutter, blind and curtain, that can be opened/closed by electric power and can prevent the external light from penetrating into the target space from the opening of the building in a closed state. The operation of the passive device 2 is controlled by the control apparatus 3. Further, the passive device 2 is provided with an operation unit (not shown in the figure) that receives user's operations relating to the passive device 2. The passive device 2 operates according to the operation performed by the operation unit. The operation unit of the passive device 2 may be a combination of a remote control device that transmits a signal in response to a user's operation and a signal receiving unit that receives the signal from the remote control device.

The control apparatus 3 controls the active device 1 and the passive device 2. The control apparatus 3 is provided with an evaluation value input unit 311, an evaluation value acquisition unit 312, a threshold setting unit 32, an outside air temperature input unit 331, an outside air temperature acquisition unit 332 (referred to hereinbelow as "acquisition unit 332"), a comparison unit 34, and a device control unit 35. The control apparatus 3 is also provided with a first device interface unit (referred hereinbelow as "first device I/F unit") 361, a second device interface unit (referred to hereinbelow as "second device I/F unit") 362, a first information acquisition unit (operation information acquisition unit) 371 (referred to hereinbelow as "acquisition unit 371"), and a second information acquisition unit 372 (referred to hereinbelow as "acquisition unit 372"). In addition, the control apparatus 3 is provided with a storage unit 38. The control apparatus 3 has, as a main constituent element, a computer (inclusive of a microcomputer) having, for example, a CPU (Central Processing Unit) and a memory, and operates according to a program stored in the storage unit 38.

The first device I/F unit 361 is connected to the active device 1 and communicates via a wire with the active device 1. Thus, the first device I/F unit 361 exchanges information with the active device 1. Further, the first device I/F unit 361 may be configured to perform wireless communication with the active device 1.

The second device I/F unit 362 is connected to the passive device 2 and communicates via a wire with the passive device 2. Thus, the second device I/F unit 362 exchanges information with the passive device 2. Further, the second device I/F unit 362 may be configured to perform wireless communication with the passive device 2.

The acquisition unit 371 acquires the operation history of the active device 1 from the active device 1. The ON operation information and OFF operation information are included as operation history. The ON operation information indicates that an ON operation for setting ON the active device 1 has been performed. The OFF operation information indicates that an OFF operation for setting OFF the active device 1 has been performed.

The acquisition unit 372 acquires operation history of the passive device 2 from the passive device 2. Examples of the operation history include ON operation information and OFF operation information. The ON operation information indicates that an ON operation for setting ON the passive device 2 has been performed. The OFF operation information indicates that an OFF operation for setting OFF the passive device 2 has been performed.

The evaluation value input unit 311 receives an input of an environment evaluation value. The evaluation value input unit 311 is an operation unit that receives, for example, an input operation of an environment evaluation value. The evaluation value acquisition unit 312 acquires the environment evaluation value inputted to the evaluation value input unit 311. The threshold setting unit 32 sets a threshold on the basis of the environment evaluation value.

The outside air temperature input unit 331 receives an input of outside air temperature information. The outside air temperature input unit 331 is a communication interface unit that communicates with an external device 4. The external device 4 is disposed, for example, in a meteorological agency and stores outside air temperature information. As a result, the outside air temperature input unit 331 receives the outside air temperature information from the external device 4. The outside air temperature information is information indicating the outside air temperature. The acquisition unit 332 acquires the outside air temperature information inputted to the outside air temperature input unit 331.

The comparison unit 34 inputs, from the acquisition unit 332, the outside air temperature information acquired by the acquisition unit 332 and inputs, from the threshold setting unit 32, the threshold set by the threshold setting unit 32. The comparison unit 34 then compares the outside air temperature in the outside air temperature information with the threshold.

The device control unit 35 selectively performs passive control (first control) and active control (second control) with respect to the active device 1 and the passive device 2 according to the comparison result of the comparison unit 34.

The device control unit 35 performs the passive control when the outside air temperature is in a temperature range on a comfortable side with respect to the threshold. Meanwhile, where the outside air temperature is in a temperature range on an uncomfortable side with respect to the threshold, the device control unit 35 performs the passive control until the ON operation information is acquired by the acquisition unit 371. At this point of time, where the active control has not yet been performed and the ON operation information has been received by the acquisition unit 371, the device control unit 35 performs the active control. When control is started, the device control unit 35 performs the passive control regardless of the outside air temperature.

The case in which the outside air temperature is in a temperature range at a comfortable side with respect to the threshold is assumed to be the case in which the outside air temperature is less than the threshold in the summertime and the case in which the outside air temperature is higher than the threshold in the wintertime. Meanwhile, the case in which the outside air temperature is in a temperature range at an uncomfortable side with respect to the threshold is assumed to be the case in which the outside air temperature is equal to or higher than the threshold in the summertime and the case in which the outside air temperature is equal to or lower than the threshold in the wintertime. The summertime as referred to herein is an interval of time in which the active device 1 performs a cooling operation upon being switched on. The wintertime as referred to herein is an interval of time in which the active device 1 performs a warming operation upon being switched on.

Therefore, in the summertime, the device control unit 35 performs the passive control when the outside air temperature is less than the threshold and allows the active control when the outside air temperature is equal to or higher than the threshold. Meanwhile, in the wintertime, where the outside air temperature is less than the threshold, the device control unit 35 performs the passive control, and where the outside air temperature is equal to or less than the threshold, the device control unit 35 allows the active control.

In the passive control, the OFF control is performed on the active device 1 and the natural environment usage control is performed on the passive device 2. In the active control, the ON control is performed on the active device 1. In the natural environment usage control, the room temperature in the target space is changed by using at least one of outside air and external light. The control contents of the natural environment usage control may be set in advance or may be set with a control contents setting unit (not shown in the figure) on the basis of the contents inputted by the user.

Examples of the active control and passive control are shown in FIG. 2. In FIG. 2, the active control and the passive control are distinguished between the summertime (June-September) and wintertime (December-March).

In the example depicted in FIG. 2, the threshold of the summertime is set to 27° C. In the summertime, where the outside air temperature is equal to or higher than 27° C., the device control unit 35 performs the ON control of the active device 1 and stops the natural environment usage control of the passive device 2 as summertime active control. Thus, the device control unit 35 performs the control of setting ON the active device 1, the control of setting OFF the ceiling fan serving as the passive device 2, the control of closing the automatic window serving as the passive device 2, and the control of closing the external light shielding device serving as the passive device 2. Meanwhile where the outside air temperature is less than 27° C., the device control unit 35 performs the OFF control of the active device 1 and the natural environment usage control of the passive device 2 and the summertime passive control. Thus, the device control unit 35 performs the control of setting OFF the active device 1, the control of setting ON the ceiling fan serving as the passive device 2, the control of opening the automatic window serving as the passive device 2, and the control of opening the external light shielding device serving as the passive device 2.

Further, in the device shown in FIG. 2, the threshold of the wintertime is set to 8° C. In the wintertime, where the outside air temperature is equal to or lower than 8° C., the device control unit 35 performs the ON control of the active device 1 and stops the natural environment usage control of the passive device 2 as the wintertime active control. Thus, the device control unit 35 performs the control of setting ON the active device 1, the control of setting OFF the ceiling fan serving as the passive device 2, the control of closing the automatic window serving as the passive device 2, and the control of opening the external light shielding device serving as the passive device 2. Meanwhile where the outside air temperature is higher than 8° C., the device control unit 35 performs the OFF control of the active device 1 and the natural environment usage control of the passive device 2 as the wintertime passive control. Thus, the device control unit 35 performs the control of setting OFF the active device 1, the control of setting OFF the ceiling fan serving as the passive device 2, the control of closing the automatic window serving as the passive device 2, and the control of opening the external light shielding device serving as the passive device 2.

Even when the outside air temperature is the same, the room temperature of the target space differs depending on the location and performance of the target house (building), thereby causing differences in the effects attained by using the outside air and external light. Therefore, the threshold should be set with consideration for the environment evaluation values of the target house.

Accordingly, the threshold setting unit 32 depicted in FIG. 1 sets the threshold on the basis of the environment evaluation values. The environment evaluation values are evaluation values relating to the entire environment affecting the thermal load on the building. The environment evaluation values include a thermal insulation evaluation value, a light utilization evaluation value, and a ventilation evaluation value relating to the building. The thermal insulation evaluation value relates to at least one of thermal insulation performance and anti-leak performance of the building, and the evaluation value is higher for a building in which heat does not escape from the inside of the building to the outside. The light utilization evaluation value relates to at least one of light utilization or heat utilization by the building, and the evaluation value is higher for a building that can effectively use solar light as at least one of light and heat. The ventilation evaluation value relates to ventilation of the building, and the evaluation value is higher where the interior of the building can be effectively ventilated by using at least one of the difference in temperature and a difference in pressure between the inside and outside of the building. The threshold setting unit 32 of the present embodiment takes the thermal insulation evaluation value and the ventilation evaluation value as the environment evaluation values during the summertime. During the wintertime, the threshold setting unit 32 takes the thermal insulation evaluation value and the light utilization evaluation value as the environment evaluation values. The environment evaluation values are not limited to the abovementioned cases and may include all of the thermal insulation evaluation value, light utilization evaluation value, and ventilation evaluation value. The environment evaluation values may be any two of the thermal insulation evaluation value, light utilization evaluation value, and ventilation evaluation value. The environment evaluation value may be also any one of the thermal insulation evaluation value, light utilization evaluation value, and ventilation evaluation value.

The environment evaluation values are determined using an environment evaluation value determination table such as depicted in FIG. 3. In FIG. 3, items relating to the house are distinguished from items relating to each room in the house.

The items relating to the house include a Q value (heat loss coefficient), a C value (equivalent gap surface area), a distance to the neighboring house (square total), a ratio of an open space to the total floor area, the main location direction, and a latitude of the location. The items relating to the house also include a ventilation frequency of the ceiling fan serving as the passive device 2 inside the house and the position of the ceiling fan. Other items relating to the house include a surface area ratio of the automatic windows (openings) serving as the passive devices 2 inside the house to the outer walls, a ratio of the south-facing automatic windows to all of the automatic windows in the house, and the mutual arrangement of the automatic windows. Other items relating to the house include a surface area ratio of the external light shielding devices (shutters, blinds, curtains, and the like) serving as the passive devices 2 inside the house to the outer walls, and a thermal conductivity of the material of the external light shielding devices. The Q value is the amount of heat escaping from the entire house to the outside per 1 square meter of the floor area in 1 hour when the difference in temperature between the inside and outside is 1° C.; this value represents thermal insulation performance of the house. The C value is a numerical value obtained by dividing the gap surface area by the floor surface area and represents the air-tightness of the house.

Items relating to each room include the orientation of the room in contact with other rooms and the floor on which the room is located. Other items relating to each room include the surface area ratio of the automatic window (opening) serving as the passive device 2 inside the room to the outer wall, the ratio of south-facing automatic windows to the total number of windows, and the mutual arrangement of the automatic windows. Other items relating to the room include the surface ratio of the external light shielding device serving as the passive device 2 inside the room to the outer wall and thermal conductivity of the material of the external light shielding device.

Among the items relating to the house, the items relating to the thermal insulation evaluation value include the Q value, the C value, the surface area ratio of the automatic windows (openings) in the house to the outer walls, and the thermal conductivity of the material of the external light shielding device. Among the items relating to each room, the items relating to the thermal insulation evaluation value include the orientation of the room in contact with other rooms, the floor on which the room is located, the surface area ratio of the automatic windows (openings) in the room to the outer walls, the surface area ratio of the external light shielding device inside the room to the outer walls, and the thermal conductivity of the material of the external light shielding device.

Among the items relating to the house, the items relating to the light utilization evaluation value include the distance to the neighboring house, the main location orientation, the latitude of the location the surface area ratio of the external light shielding device inside the house to the outer walls, and the ratio of south-facing windows among the external light shielding devices. Among the items relating to each room, the items relating to the light utilization evaluation value include the surface area ratio of the automatic windows (openings) in the room to the outer walls and the ratio of the south-facing windows.

Among the items relating to the house, the items relating to the ventilation evaluation value include the distance to the neighboring house, the ratio of the open space to the total floor area, the ventilation frequency of the ceiling fan inside the house, the position of the ceiling fan, the surface area ratio of the automatic windows (openings) inside the house to the outer walls, and the mutual arrangement of the automatic windows. Among the items relating to each room, the items relating to the ventilation evaluation value include the surface area ratio of the automatic windows (openings)

inside the room to the outer walls and the mutual arrangement of the automatic windows.

Scores of at least some of the thermal insulation evaluation value, light utilization evaluation value, and ventilation evaluation value are presented in FIG. 4 with respect to the items relating to the house and items relating to each room which are depicted in FIG. 3. The scores are obtained for all of the items, but only some of the items are depicted in FIG. 4. For example, in the Q value, where the Q value is less than 1.9, the thermal insulation evaluation value is +5. Where the Q value is equal to or greater than 2.7, the thermal insulation evaluation value is 0. In the distance to the neighboring house, where the distance is 50 m, the light utilization evaluation value is +2 and the ventilation evaluation value is +3. The thermal insulation evaluation value, light utilization evaluation value, and ventilation evaluation value are each determined as a sum total of the scores depicted in FIG. 4.

Figure 5:
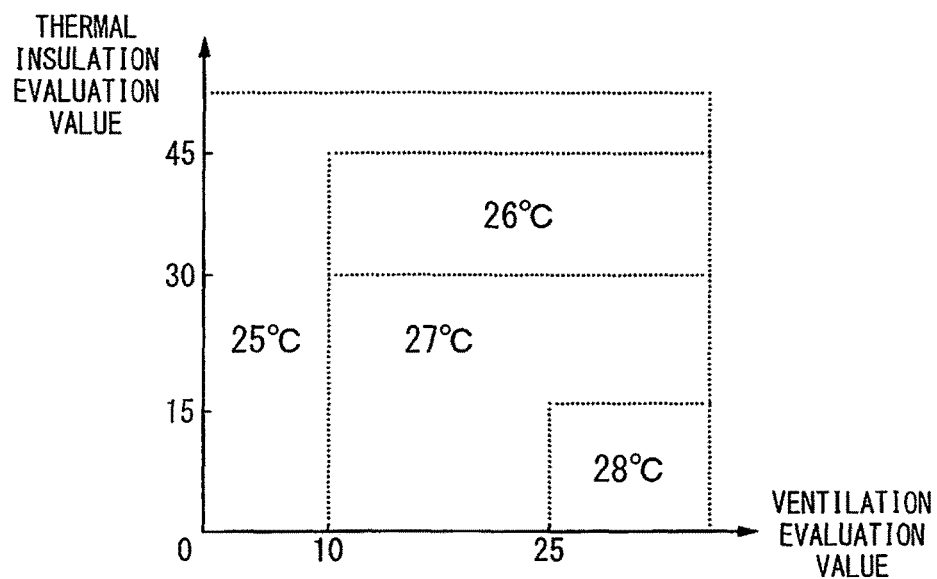
FIG. 5 is a diagram to be used when setting an outside air temperature threshold for summertime in the control apparatus according to Embodiment 1.

In the summertime, as shown in FIG. 5, the threshold is set from the thermal insulation evaluation value and the ventilation evaluation value as the environment evaluation values. For example, where the thermal insulation evaluation value is 28 and the ventilation evaluation value is 20, the threshold is set to 27° C. Where the thermal insulation evaluation value is 40 and the ventilation evaluation value is 8, the threshold is set to 25° C.

Figure 6:
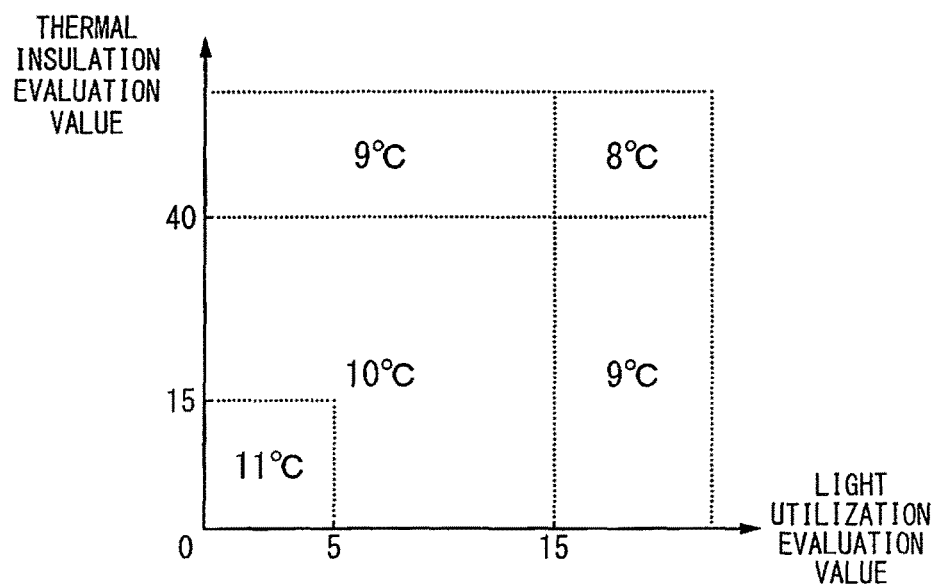
FIG. 6 is a diagram to be used when setting an outside air temperature threshold for wintertime in the control apparatus according to Embodiment 1.

In the wintertime, as shown in FIG. 6, the threshold is set from the thermal insulation evaluation value and the light utilization evaluation value as the environment evaluation values. For example, where the thermal insulation evaluation value is 42 and the light utilization evaluation value is 18, the threshold is set to 8° C. Where the thermal insulation evaluation value is 20 and the light utilization evaluation value is 10, the threshold is set to 10° C.

However, the threshold setting unit 32 depicted in FIG. 1 may also determine the environment evaluation value (thermal insulation evaluation value, light utilization evaluation value, ventilation evaluation value) by using FIGS. 3 and 4. In this case, the threshold setting unit 32 determines the environment evaluation values by using at least one of the heat loss coefficient (Q value) and equivalent gap surface area (C value) of the building. Further, the threshold setting unit 32 may also determine the environment evaluation values by using the surface area ratio of the openings in the building to the outer walls.

The threshold setting unit 32 sets the threshold on the basis of the determined environment evaluation values. The threshold setting unit 32 of the present embodiment sets the threshold as depicted in FIGS. 5 and 6 by using the thermal insulation evaluation value, light utilization evaluation value, and ventilation evaluation value determined as the environment evaluation values. During the summertime, the threshold setting unit 32 sets the threshold by using the thermal insulation evaluation value and the ventilation evaluation value as the environment evaluation values as depicted in FIG. 5. During the wintertime, the threshold setting unit 32 sets the threshold by using the thermal insulation evaluation value and the light utilization evaluation value as the environment evaluation values as depicted in FIG. 6.

As mentioned hereinabove, the threshold setting unit 32 sets the summertime threshold from the thermal insulation evaluation value and the ventilation evaluation value and sets the wintertime threshold form the thermal insulation evaluation value and the light utilization evaluation value, but it is not always necessary to set the threshold by the environment evaluation values of two kinds, and the threshold may be also set by an environment evaluation value of one kind.

The storage unit 38 depicted in FIG. 1 stores a program according to which the control apparatus 3 (computer) executes various functions. Thus, the storage unit 38 stores a program for causing the control apparatus 3 to function as the evaluation value acquisition unit 312, the threshold setting unit 32, the acquisition unit 332, the comparison unit 34, the device control unit 35, the acquisition unit 371, and the acquisition unit 372. Further, the program can be also a program for causing the control apparatus 3 to function as the evaluation value input unit 311, the outside air temperature input unit 331, the first device I/F unit 361, the second device I/F unit 362, and the storage unit 38. The program is stored in advance in the storage unit 38 when the control apparatus 3 is shipped. However, where the control apparatus 3 acquires the program after shipping, a computer-readable recording medium where the program is recorded can be used by the control apparatus 3 to acquire the program. Where the recording medium is used, the control apparatus 3 may be provided with a reading device (not shown in the figure) for reading data from the recording medium. Examples of the recording medium include an optical disk and a memory card. A drive device that reads information from an optical disk and a memory card reader that reads information from a memory card can be used as the reading device. Downloading the program from another device via a network can be used by the control apparatus 3 as another method for acquiring the program. Where the downloading method is used, the control apparatus 3 may have a communication function for communicating with the other device via a network.

Figure 7:
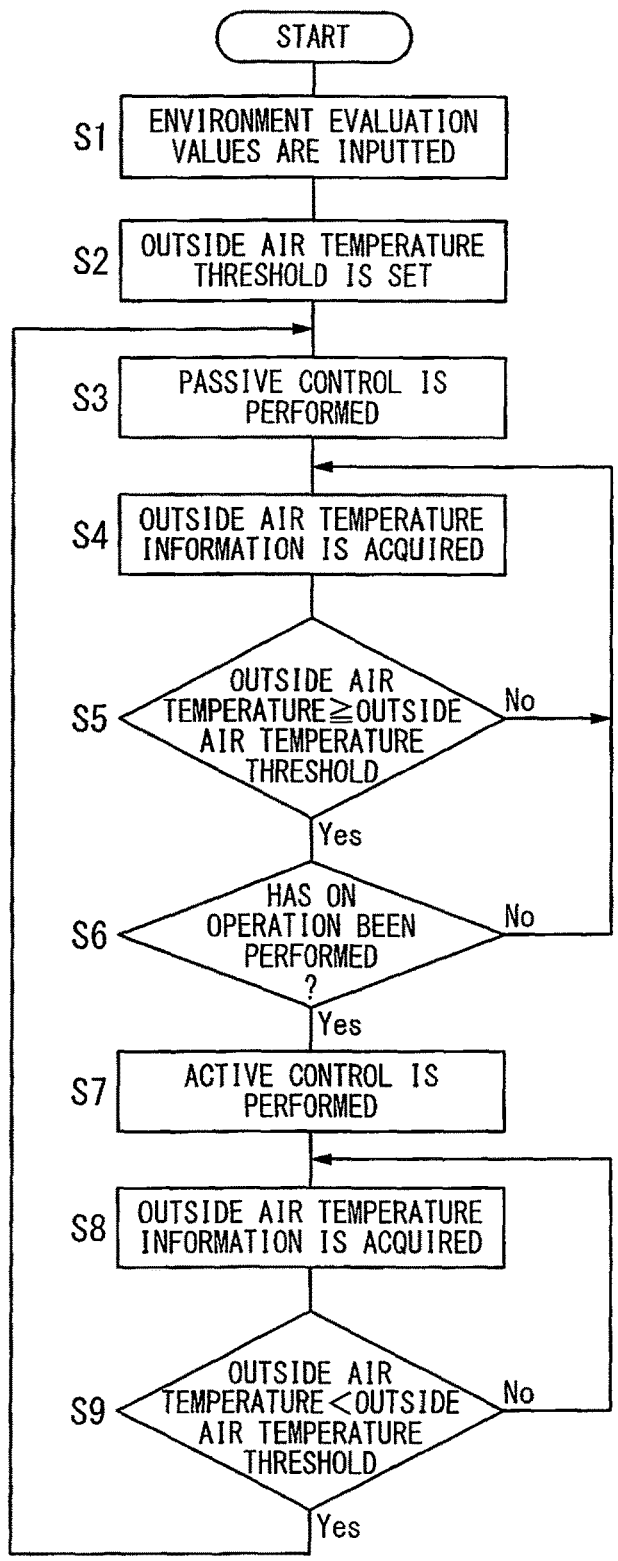
FIG. 7 is a flowchart illustrating the operation of the control apparatus according to Embodiment 1.

The operation of the control apparatus 3 according to the present embodiment will be explained hereinbelow with reference to FIG. 7. The case of summertime is explained hereinbelow. The control contents of the natural environment usage control of the passive device 2 are stored in advance. Initially, the user inputs the environment evaluation values into the control apparatus 3 (S1). Thus, the evaluation value input unit 311 receives the input of the environment evaluation values. The evaluation value acquisition unit 312 acquires the environment evaluation values. Then, the threshold setting unit 32 sets the threshold by using the environment evaluation values (S2). The device control unit 35 then performs passive control of the active device 1 and the passive device 2 as the initial control (S3).

The outside air temperature input unit 331 then receives outside air temperature information from the external device 4. The acquisition unit 332 acquires the outside air temperature information (S4). The comparison unit 34 then compares the outside air temperature with the threshold (S5). Where the outside air temperature is less than the threshold (No in S5), the processing returns to step S4, and the device control unit 35 continuously performs the passive control.

Meanwhile, where the outside air temperature is equal to or higher than the threshold (Yes in S5), the device control unit 35 allows the active control. Where an operation of ON control of the active device 1 is performed when the outside air temperature is equal to or higher than the threshold (Yes in S6), the device control unit 35 switches from the passive control to the active control (S7). Then, the outside air temperature input unit 331 receives the outside air temperature information from the external device 4, and the acquisition unit 332 acquires the outside air temperature information (S8). Then, where the outside air temperature is equal to or higher than the threshold (No in S9), the processing returns to step S8. Meanwhile where the outside air temperature is less than the threshold (Yes in S9), the processing returns to step S3, and the device control unit 35 switches from the active control to the passive control.

Figure 8:
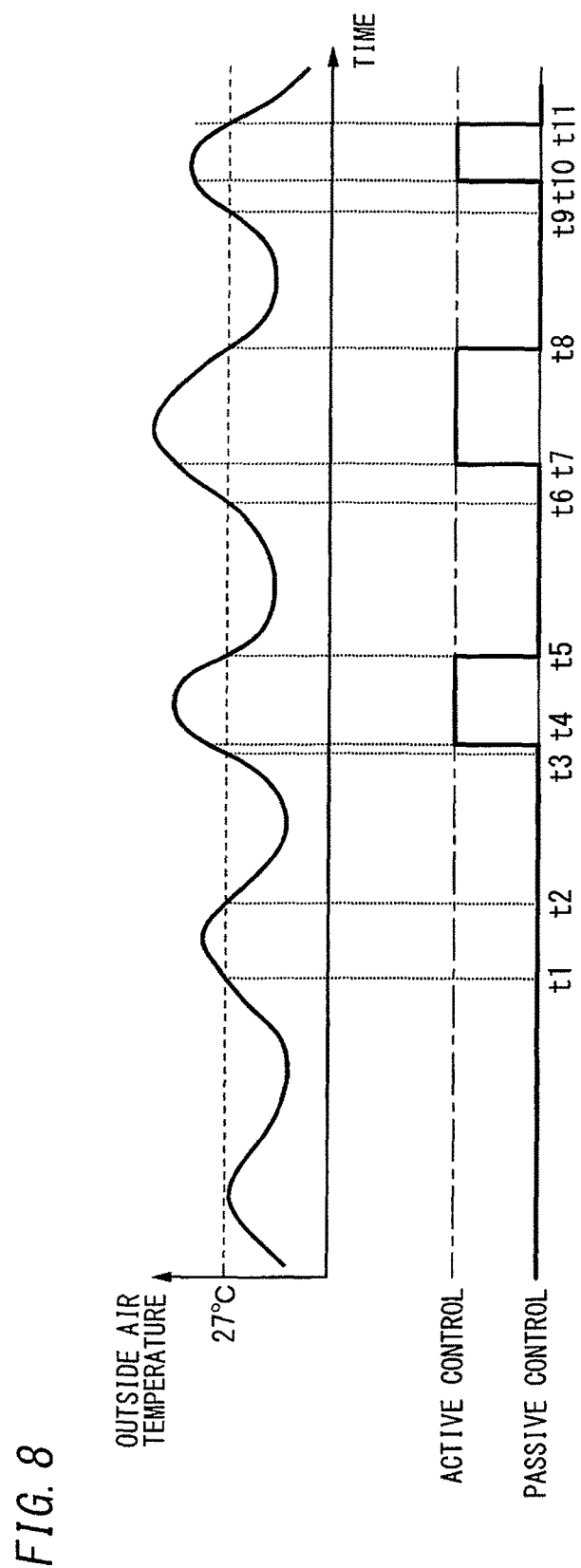
FIG. 8 is an explanatory drawing of the operation of the control apparatus according to Embodiment 1.

An example of the operation of the control apparatus 3 of the present embodiment is explained using FIG. 8. The threshold is set to 27° C. Initially, the control apparatus 3 performs the passive control in a time slot in which the outside air temperature is less than the threshold (27° C.) from the control start to a timing t1. Then, where the outside air temperature becomes equal to or higher than the threshold between the timing t1 and a timing t2, the control apparatus 3 allows the active control, but since the ON operation has not been performed on the active device 1, the control apparatus 3 continues the passive control. Where the outside air temperature thereafter again becomes equal to or higher than the threshold (timing t3), the control apparatus 3 allows the active control. Where the ON operation is thereafter performed on the active device 1 (timing t4), the control apparatus 3 stops the passive control and starts the active control. Where the outside air temperature thereafter becomes less than the threshold (timing t5), the control apparatus 3 stops the active control and starts the passive control. Where the outside air temperature thereafter again becomes equal to or higher than the threshold (timing t6), the control apparatus 3 allows the active control. Where the ON operation is thereafter performed on the active device 1 (timing t7), the control apparatus 3 stops the passive control and starts the active control. Where the outside air temperature thereafter becomes less than the threshold (timing t8), the control apparatus 3 stops the active control and starts the passive control. Then, the control apparatus 3 repeats the operations of timings t3 to t5 in the interval between a timing t9 and a timing t11.

In the wintertime, the control apparatus 3 initially performs the passive control. Then, where the outside air temperature becomes equal to or lower than the threshold, the control apparatus 3 allows the active control. Where the ON operation is performed thereafter with respect to the active device 1 while the control apparatus 3 allows the active control, the control apparatus 3 preforms the active control.

The above-described control apparatus 3 of the present embodiment controls the active device 1 and the passive device 2 that change the room temperature in the target space of the building. The control apparatus 3 includes the outside air temperature acquisition unit 332, the threshold setting unit 32, the comparison unit 34, the device control unit 35, and the operation information acquisition unit 371. The outside air temperature acquisition unit 332 acquires outside air temperature information indicating the air temperature outside the building. The threshold setting unit 32 sets the outside air temperature threshold. The comparison unit 34 compares the outside air temperature in the outside air temperature information acquired by the outside air temperature acquisition unit 332 with the outside air temperature threshold that has been set by the threshold setting unit 32. The device control unit 35 selectively performs the first control or the second control according to the comparison result of the comparison unit 34. In the first control, the OFF control is performed on the active device 1, and the natural environment usage control is performed on the passive device 2. The natural environment usage control changes the room temperature by using at least one of the outside air and external light. In the second control, the ON control is performed on the active device 1. The operation information acquisition unit 371 acquires the ON operation information. The ON operation information indicates that an ON operation for setting ON the active device 1 has been performed. Where the outside air temperature is in a temperature range on the comfortable side with respect to the outside air temperature threshold, the device control unit 35 performs the first control. Meanwhile, where the outside air temperature is in a temperature range on the uncomfortable side with respect to the outside air temperature threshold, the device control unit 35 performs the first control until the ON operation information is acquired by the operation information acquisition unit 371, and performs the second control once the ON operation information is acquired by the operation information acquisition unit 371.

The program of the present embodiment serves to cause a computer to function as the outside air temperature acquisition unit 332, the threshold setting unit 32, the comparison unit 34, the operation information acquisition unit 371, and the device control unit 35, such that the computer controls the active device 1 and the passive device 2 that change the room temperature in the target space of the building. The outside air temperature acquisition unit 332 acquires outside air temperature information indicating the outside air temperature outside the building. The threshold setting unit 32 sets the outside air temperature threshold. The comparison unit 34 compares the outside air temperature in the outside air temperature information acquired by the outside air temperature acquisition unit 332 with the outside air temperature threshold that has been set by the threshold setting unit 32. The operation information acquisition unit 371 acquires the ON operation information. The ON operation information indicates that an ON operation for setting ON the active device 1 has been performed. The device control unit 35 selectively performs the first control or the second control according to the comparison result of the comparison unit 34. In the first control, the OFF control is performed on the active device 1, and the natural environment usage control is performed on the passive device 2. The natural environment usage control changes the room temperature by using at least one of the outside air and external light. In the second control, the ON control is performed on the active device 1. Where the outside air temperature is in a temperature range on the comfortable side with respect to the outside air temperature threshold, the device control unit 35 performs the first control. Meanwhile, where the outside air temperature is in a temperature range on the uncomfortable side with respect to the outside air temperature threshold, the device control unit 35 performs the first control until the ON operation information is acquired by the operation information acquisition unit 371, and performs the second control once the ON operation information is acquired by the operation information acquisition unit 371.

As mentioned hereinabove, the control apparatus 3 of the present embodiment performs the ON control of the active device 1 where the ON operation for setting ON the active device 1 is performed when the outside air temperature is in the temperature range on the uncomfortable side with respect to the outside air temperature threshold. As a result, with the control apparatus 3 of the present embodiment, the waste (excessive use) of energy can be reduced by comparison with the case in which the ON control of the active device is performed immediately after the outside air temperature falls into a temperature range on an uncomfortable side with respect to the outside air temperature threshold. As a result, energy savings can be realized while ensuring comfort for people in a target space.

It is preferred that the threshold setting unit 32 set the outside air temperature threshold on the basis of the environment evaluation value including at least one of the thermal insulation evaluation value, the light utilization evaluation value, and the ventilation evaluation value relating to the building, as in the control apparatus 3 of the present embodiment.

As indicated hereinabove, in the control apparatus 3 of the present embodiment, the outside air temperature threshold is set on the basis of the environment evaluation value including at least one of the thermal insulation evaluation value, the light utilization evaluation value, and the ventilation evaluation value relating to the building. As a result, with the control apparatus 3 of the present embodiment, the outside air temperature threshold can be set to reflect the difference in building performance. Therefore, comfort for people inside the target space and energy savings can be further improved.

It is also preferred that the threshold setting unit 32 determine the environment evaluation value by using at least one of the heat loss coefficient and the equivalent gap surface area of the building, and set the outside air temperature threshold on the basis of the environment evaluation value, as in the control apparatus 3 of the present embodiment.

With the control apparatus 3 of the present embodiment, the environment evaluation values can be determined more accurately by taking into account at least one of the heat loss coefficient and the equivalent gap surface area which apparently greatly affect the environment of the target space of the building.

It is also preferred that the threshold setting unit 32 determine the environment evaluation value by using the ratio of the surface area of the opening to the surface area of the outer wall in the building, and set the outside air temperature threshold on the basis of the environment evaluation value, as in the control apparatus 3 of the present embodiment.

With the control apparatus 3 of the present embodiment, the environment evaluation values can be determined more accurately by taking into account the ratio of the surface area of the opening to the surface area of the outer wall which apparently greatly affects the environment of the target space of the building.

The active device 1 and the passive device 2 are preferably the following devices, as in the present embodiment. The active device 1 is a device changing the room temperature in the target space by cooling or warming the air in the target space. The passive device 2 is a device changing the room temperature in the target space by using at least one of outside air and external light.

It is preferred that the active device 1 change the room temperature in the target space by cooling or warming the air in the target space such that the room temperature in the target space becomes a set temperature, as in the present embodiment.

The control contents of the natural environment usage control of the passive device 2 differs depending on whether a person is present in the target space. Where a person is present in the target space, the device control unit 35 performs the control of operating the large window and external light shielding device, as depicted in FIG. 2, as the summertime natural environment usage control. Meanwhile, when no person is present in the target space, the device control unit 35 performs the control of closing the large window and the external light shielding device, as depicted in FIG. 9, as the summertime natural environment usage control. Thus, the control contents of the large window and the external light shielding device is different in the active control and passive control when a person is present in the target space (see FIG. 2), but the contents control is the same in the active control and passive control when no person is present in the target space (see FIG. 9). A person present in the target space is detected by a person detection device such as person-sensitive sensor. The control apparatus 3 determines whether a person is present in the target space by acquiring detection information indicating that a person is present in the target space from the person detection device.

The control contents of the natural environment usage control of the external light shielding device serving as the passive device 2 also differs depending on timing. For example, in the wintertime, the device control unit 35 performs the control of opening the external light shielding device, as depicted in FIG. 2, during the day. Meanwhile, the device control unit 35 performs the control of closing the external light shielding dice, as depicted in FIG. 9, during the night.

Embodiment 2

The control apparatus 3 according to Embodiment 2 is different from the control apparatus 3 according to Embodiment 1 in that switching from the active control to the passive control is performed with a predetermined time delay when the outside air temperature reaches a temperature range on a comfortable side with respect to the threshold while the active control is performed. The constituent elements same as those of the control apparatus 3 according to Embodiment 1 are assigned with the same reference numerals and the explanation thereof is herein omitted.

When the outside air temperature reaches a temperature range on a comfortable side with respect to the threshold while the active control is performed, the device control unit 35 of the present embodiment switches from the active control to the passive control with a time delay determined according to the environment evaluation values. Thus, in this case, the device control unit 35 performs the OFF control after a predetermined delay time T1 elapses, instead of performing the OFF control of the active device 1 instantaneously, with consideration for the time delay of thermal conduction of walls and roof surface. The explanation of functions same as those of the device control unit 35 of Embodiment 1 is herein omitted.

Figure 10:
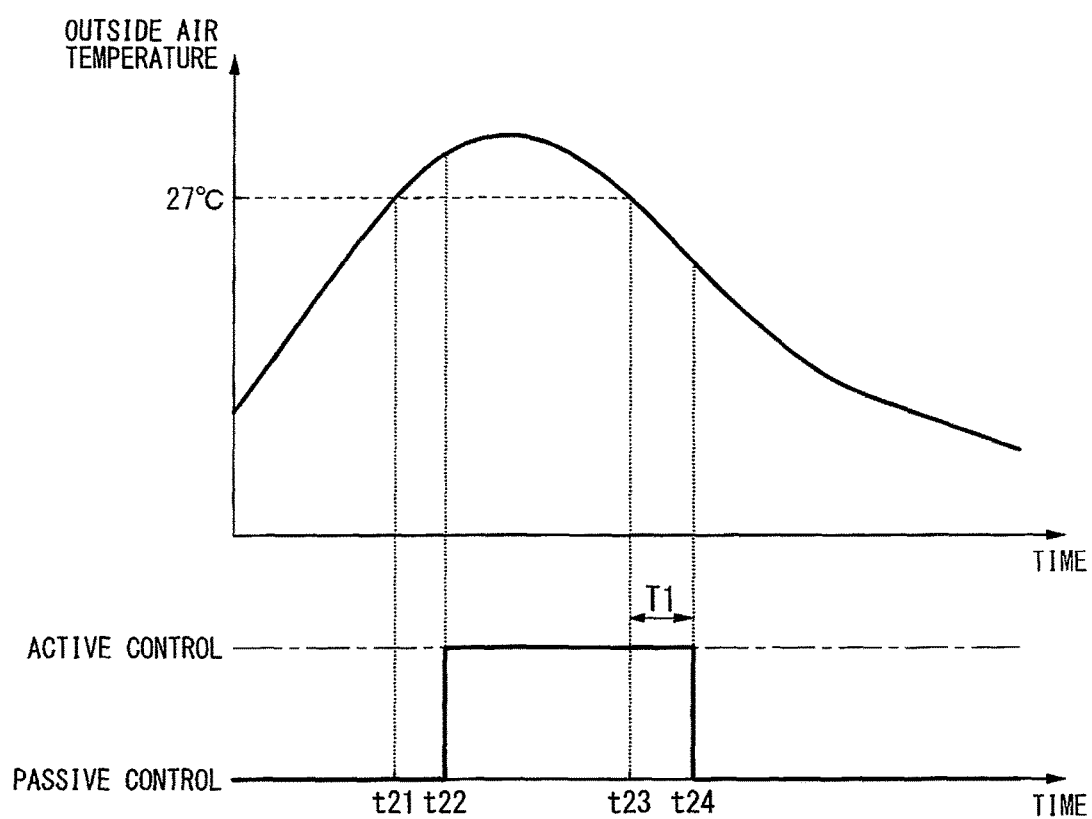
FIG. 10 is an explanatory drawing of the operation of the control apparatus according to Embodiment 2.

FIG. 10 illustrates the operation during the summertime. The threshold is set to 27° C. Where the outside air temperature becomes equal to or higher than 27° C. (timing t21), the device control unit 35 allows the active control. Where an ON operation is thereafter performed at a timing t22, the device control unit 35 switches from the passive control to the active control. Where the outside air temperature then becomes less than 27° C. (timing t23), the device control unit 35 switches from the active control to the passive control at a timing t24 after the delay time T1 elapses after the timing t23.

The control apparatus 3 of the present embodiment is provided with a time setting unit (not shown in the figure). The time setting unit sets the delay time T1 by using the Q value, the C value, and the number of floors. The delay time T1 is a value which is set with consideration, for example, for the time delay of thermal conduction of walls and roof surface and differs between the uppermost floor and a floor other than the uppermost floor. Thus, where the air conditioning system of the present embodiment is used in a dwelling unit of an apartment building, the delay time T1 differs depending on the floor at which the dwelling unit is located. The same is true when the air conditioning system of the present embodiment is used, for example, in an office at a specific floor of a building.

Figure 11:
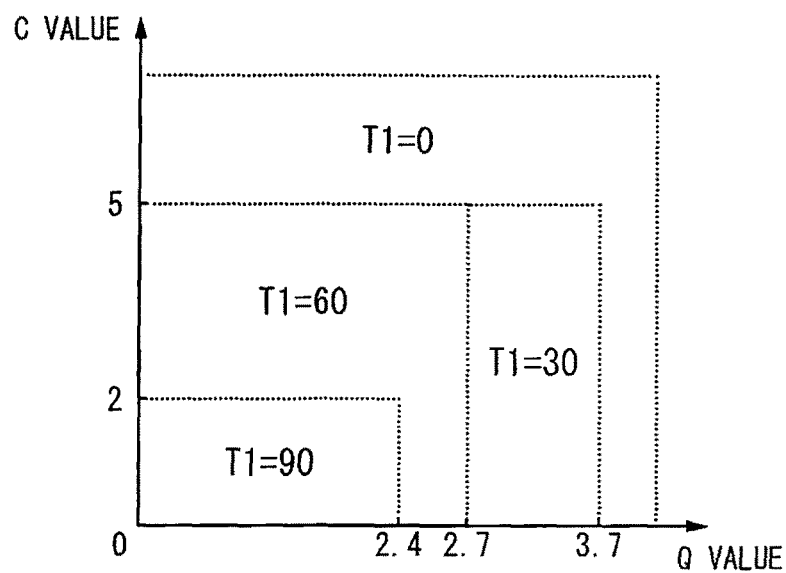
FIG. 11 illustrates items to be used when setting a delay time for an uppermost floor in the control apparatus according to Embodiment 2.
Figure 12:
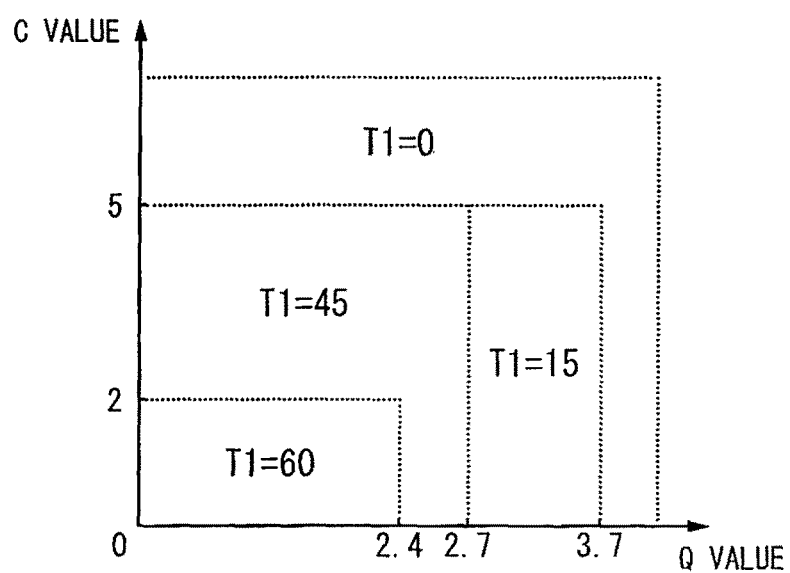
FIG. 12 illustrates items to be used when setting a delay time for floors other than the uppermost floor in the control apparatus according to Embodiment 2.

FIG. 11 shows the correspondence table of the delay time T1 for the uppermost floor. FIG. 12 shows the correspondence table of the delay time T1 for a floor other than the uppermost floor. For example, where the Q value is 3.2 and the C value is 3 at the uppermost floor, the delay time T1 is 30 min. Where the Q value is 2.0 and the C value is 1, the delay time T1 is 90 min. Where the Q value is 3.2 and the C value is 3 at a floor other than the uppermost floor, the delay time T1 is 15 min. Where the Q value is 2.0 and the C value is 1, the delay time T1 is 60 min.

It is preferred that, when the outside air temperature reaches the temperature range on the comfortable side with respect to the outside air temperature threshold while the second control is performed, the device control unit 35 switch from the second control to the first control with a time delay determined according to the environment evaluation value, as in the control apparatus 3 of the above-described present embodiment.

As mentioned hereinabove, when the outside air temperature reaches the temperature range on the comfortable side with respect to the outside air temperature threshold while the active control is performed, the control apparatus 3 of the present embodiment switches from the active control to the passive control after the delay time T1 determined according to the environment evaluation value. As a result, in the control apparatus 3 of the present embodiment, switching from the active control to the passive control can be performed with consideration, for example, for the time delay of thermal conduction in the wall and roof surface. As a result, the active device 1 and the passive device 2 can be controlled without losing comfort for the people inside the target space.

Embodiment 3

The control apparatus 3 according to Embodiment 3 is different from the control apparatus 3 according to Embodiment 1 in that the active device 1 can be temporarily operated, as desired by the user, when the outside air temperature is in a temperature range on a comfortable side with respect to the threshold. The constituent elements same as those of the control apparatus 3 according to Embodiment 1 are assigned with the same reference numerals and the explanation thereof is herein omitted.

Where the ON operation is performed on the active device 1 when the passive control is performed, the device control unit 35 of the present embodiment switches from the passive control to the active control, and where a predetermined period of time elapses since the active control has been started, the device control unit returns to the passive control. Thus, when the ON operation information is acquired by the acquisition unit 371 while the passive control is performed, the device control unit 35 switches from the passive control to the active control, and then returns to the passive control even if no OFF operation is performed on the active device 1. The explanation of functions same as those of the device control unit 35 of Embodiment 1 is herein omitted.

Figure 13:
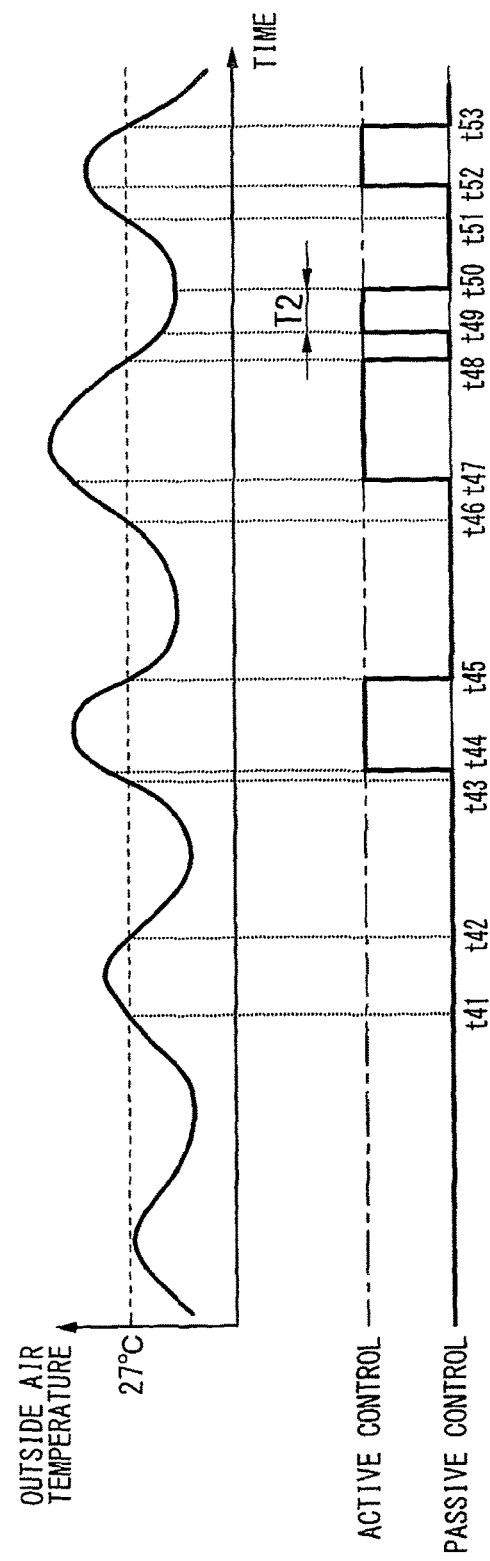
FIG. 13 is an explanatory drawing of the operation of the control apparatus according to Embodiment 3.

An example of the operation of the control apparatus 3 of the present embodiment is explained using FIG. 13. The threshold is set to 27° C. Initially, the control apparatus 3 performs the passive control in a time slot in which the outside air temperature is less than the threshold (27° C.) from the control start to a timing t41. Then, where the outside air temperature becomes higher than the threshold between the timing t41 and a timing t42, the control apparatus 3 allows the active control, but since the ON operation has not been performed on the active device 1, the control apparatus 3 continues the passive control. Where the outside air temperature thereafter again becomes higher than the threshold (timing t43), the control apparatus 3 allows the active control. Where the ON operation is thereafter performed on the active device 1 (timing t44), the control apparatus 3 stops the passive control and starts the active control. Where the outside air temperature thereafter becomes less than the threshold (timing t45), the control apparatus 3 stops the active control and starts the passive control. Where the outside air temperature thereafter again becomes higher than the threshold (timing t46), the control apparatus 3 allows the active control again. Where the ON operation is thereafter performed on the active device 1 (timing t47), the control apparatus 3 stops the passive control and starts the active control. Where the outside air temperature thereafter becomes less than the threshold (timing t48), the control apparatus 3 stops the active control and starts the passive control.

Where the ON operation is performed on the active device 1 when the passive control is performed (timing t49), the control apparatus 3 immediately switches from the passive control to the active control. The control apparatus 3 then performs the active control from the timing t49 until a time T2 elapses, and the active control is automatically switched to the passive control at a timing t50 even if the OFF operation is not performed on the active device 1. The control apparatus 3 then repeats the operations of timings t43 to t45 at the timings t51 to t53.

It is preferred that, when the ON operation is performed while the first control is performed, the device control unit 35 switch from the first control to the second control, and return to the first control after a predetermined time elapses since the second control has been started, as in the control apparatus 3 of the above-described present embodiment.

As described hereinabove, the control apparatus 3 of the present embodiment performs the second control, that is, the ON control of the active device, for a predetermined time where the ON operation is performed on the active device 1 when the OFF control is performed on the active device 1. As a result, with the control apparatus 3 of the present embodiment, energy savings can be realized while reflecting the user's intentions.

Embodiment 4

The control apparatus 3 according to Embodiment 4 is different from the control apparatus 3 according to Embodiment 1 in that the threshold is reset in response to the ON operation performed by the user with respect to the active device 1. The constituent elements same as those of the control apparatus 3 according to Embodiment 1 are assigned with the same reference numerals and the explanation thereof is herein omitted.

Where the ON operation is performed on the active device 1 a first specified number of times or more, within a first predetermined period of time when the device control unit 35 performs the passive control, the threshold setting unit 32 of the present embodiment resets the threshold to a temperature on the comfortable side with respect to the present set temperature. The explanation of functions same as those of the threshold setting unit 32 of Embodiment 1 is herein omitted.

Figure 14:
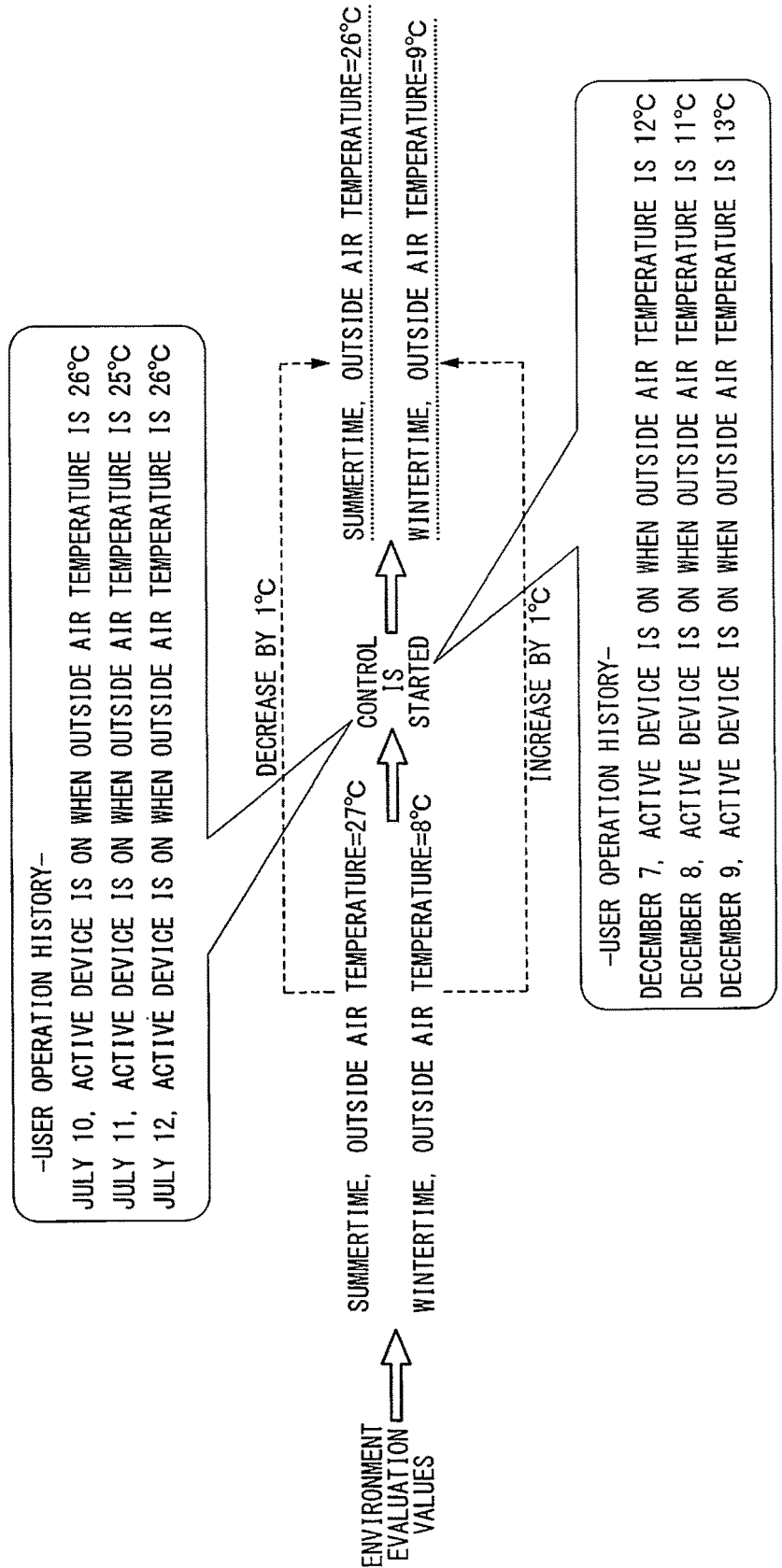
FIG. 14 is an explanatory drawing of the operation of the control apparatus according to Embodiment 4.

An example of the operation of the control apparatus 3 of the present embodiment is explained hereinbelow with reference to FIG. 14. In the summertime, the device control unit 35 starts the passive control in a state in which the threshold is set, for example, at 27° C. Where the ON operation is performed on the active device 1 the first specified number of times or more, within the first predetermined period of time while the device control unit 35 performs the passive control, the threshold setting unit 32 resets the summertime threshold to 26° C. For example, the user operation history is assumed in which an ON operation was performed at outside air temperature of 26° C. (June 10), an ON operation was performed at outside air temperature of 25° C. (June 11), and an ON operation was performed at outside air temperature of 26° C. (June 12), as depicted in FIG. 14. In this case, the threshold setting unit 32 resets the threshold to a temperature of 26° C. which is by 1° C. lower than the present set temperature (27° C.). Then, the device control unit 35 starts the active control once the outside air temperature becomes equal to the reset threshold (26° C.).

Further, in the wintertime, the device control unit 35 starts the passive control in a state in which the threshold is set, for example, at 8° C. Where the ON operation is performed on the active device 1 the first specified number of times or more, within the first predetermined period of time while the device control unit 35 performs the passive control, the threshold setting unit 32 resets the wintertime threshold to 9° C. For example, the user operation history is assumed in which an ON operation was performed at an outside air temperature of 12° C. (December 7), an ON operation was performed at an outside air temperature of 11° C. (December 8), and an ON operation was performed at an outside air temperature of 13° C. (December 9), as depicted in FIG. 14. In this case, the threshold setting unit 32 resets the threshold to a temperature of 9° C. which is by 1° C. higher than the present set temperature (8° C.). Then, the device control unit 35 starts the active control once the outside air temperature becomes equal to the reset threshold (9° C.)

Where the ON operation is performed on the active device 1 the first specified number of times or more, within the first predetermined period of time while the device control unit 35 performs the passive control after the threshold has been reset, the threshold setting unit 32 resets the threshold by changing the temperature by 1° C. in the same manner as in the above-described operation.

It is preferred that the threshold setting unit 32 reset the outside air temperature threshold to a temperature on the comfortable side when the ON operation is performed a first specified number of times or more, within the first predetermined period of time while the first control is performed, as in the control apparatus 3 of the above-described present embodiment.

The control apparatus 3 of the present embodiment resets the threshold in response to the ON operation of the active device 1. As a result, in the control apparatus 3 of the present embodiment, the user's preferences can be satisfied without a significant loss in energy savings.

Embodiment 5

The control apparatus 3 according to Embodiment 5 is different from the control apparatus 3 according to Embodiment 1 in that the opening-closing control of the automatic windows (in this case, only large windows are considered) and the external light shielding device, which serve as the passive devices 2, is determined by a detection signal of a person detection device (person-sensitive sensor) 5 in the summertime passive control. The constituent elements same as those of the control apparatus 3 according to Embodiment 1 are assigned with the same reference numerals and the explanation thereof is herein omitted.

Figure 15:
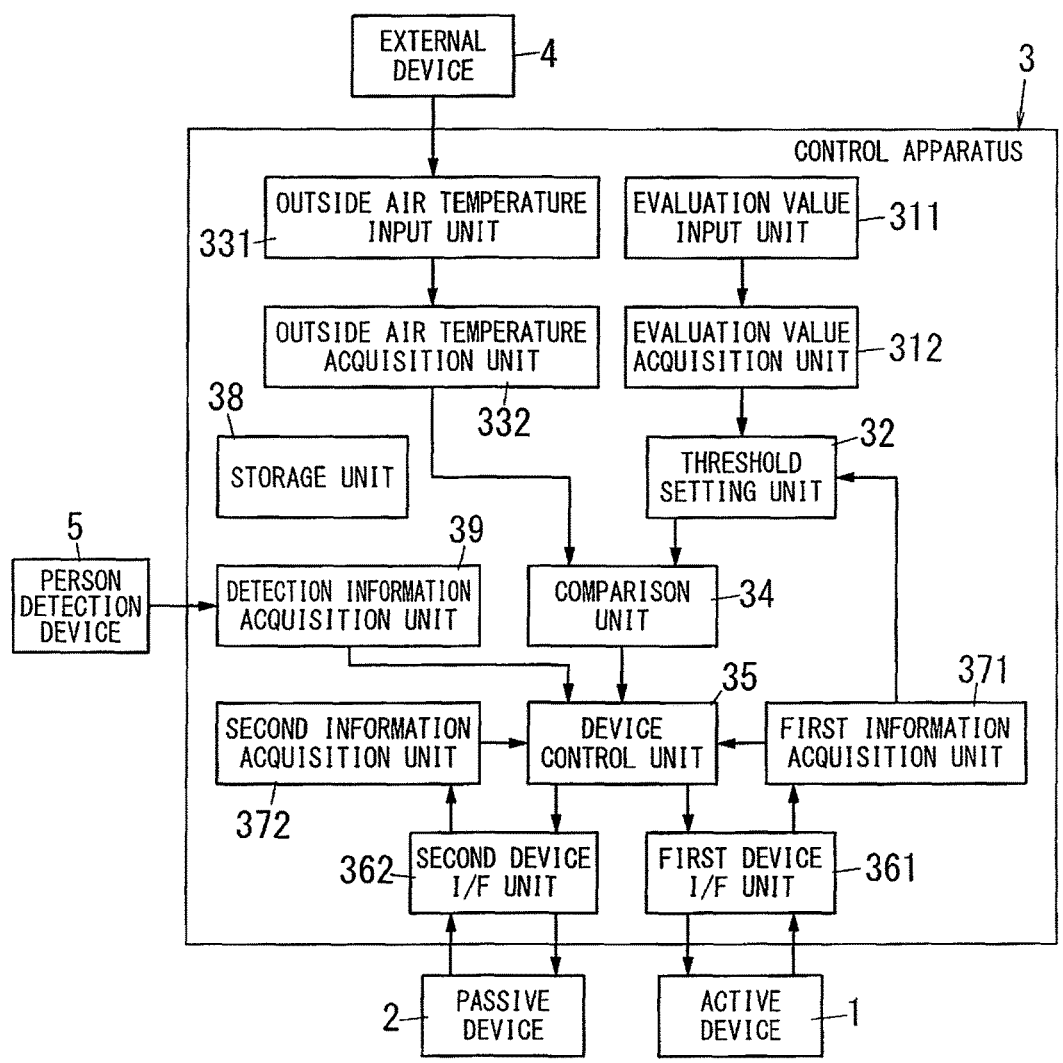
FIG. 15 is a block diagram illustrating the configuration of the control apparatus according to Embodiment 5.

As depicted in FIG. 15, the control apparatus 3 of the present embodiment is provided with a detection information acquisition unit 39. The detection information acquisition unit 39 acquires detection information indicating the presence of a person in the target space from the person detection device 5. The person detection device 5 is, for example, a person-sensitive sensor, and detects a person present in the target space.

Where a person is present in the target space when the passive control is performed, the device control unit 35 of the present embodiment performs the opening control of the automatic windows (in this case, only large windows are the object of consideration) and the external light shielding device which serve as the passive devices 2. Meanwhile, where no person is present in the target room, the device control unit 35 performs the closing control of the automatic windows and the external light shielding device, which serve as the passive devices 2. The explanation of functions same as those of the device control unit 35 of Embodiment 1 is herein omitted.

Figure 16:
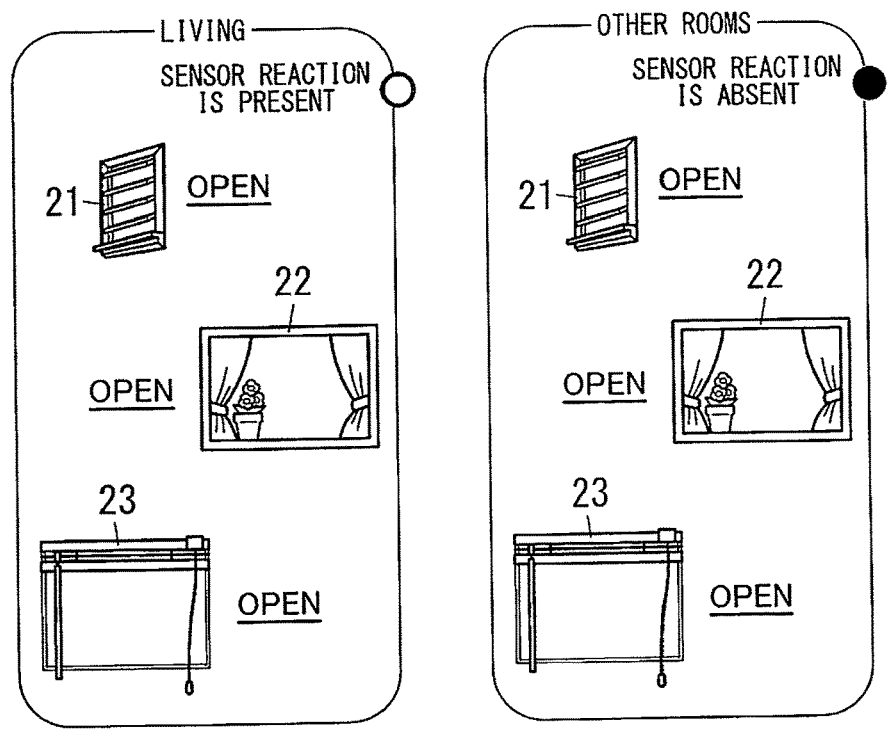
FIG. 16 is an explanatory drawing of the operation of the control apparatus according to Embodiment 5.
Figure 17:
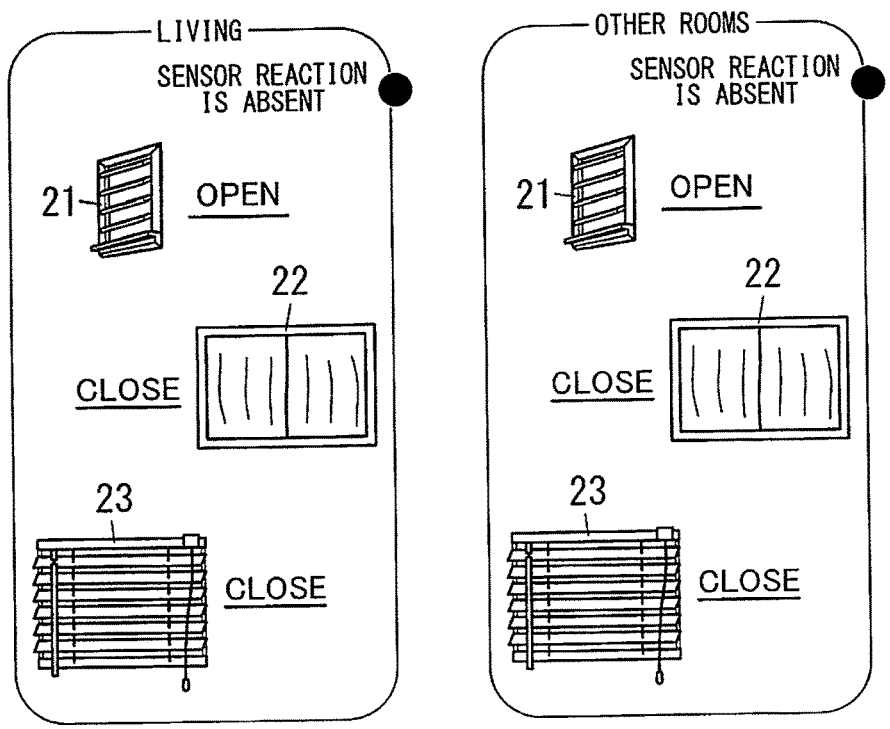
FIG. 17 is an explanatory drawing of the operation of the control apparatus according to Embodiment 5.

For example, where detection information from any person detection device 5 inside a house unit is present, the device control unit 35 performs opening control of the small window 21, the large window 22, and the external light shielding device 23 as the passive devices 2, as depicted in FIG. 16.

Where detection information from any person detection device 5 inside a house unit is not present, for example, when nobody is at home or everybody is sleeping, the device control unit 35 performs the closing control of the large window 22 and the external light shielding device 23 as the passive device 2 with consideration for crime prevention, as depicted in FIG. 17. Where the small window 21 is open, crime still can be prevented and the effect of external air usage can be expected. Therefore, the device control unit 35 performs the opening control of the small window 21 at all times.

It is preferred that the passive device 2 be an automatic window and an external light shielding device installed in an opening of the building, and the device control unit 35 perform the following operations, as in the control apparatus 3 of the above-described present embodiment. Thus, the device control unit 35 performs the opening control on the automatic window and the external light shielding device when a person is present in the target space, while the first control is performed. Meanwhile, the device control unit 35 performs the closing control on the automatic window and the external light shielding device when a person is not present in the target space.

As indicated hereinabove, the control apparatus 3 of the present embodiment performs the opening control on the automatic window (in this case, only the large window 22 is the object) as the passive device 2 when a person is present in the target space, and performs the closing control on the automatic window when no person is present in the target space. As a result, with the control apparatus 3 of the present embodiment, the control that takes into account crime prevention can be performed without losing the effect of external air.

Further, the control apparatus 3 of the present embodiment performs the opening control on the automatic window (in this case, only the large window 22 is the object) and the external light shielding device 23 as the passive devices 2 when a person is present in the target space. As a result, with the control apparatus 3 of the present embodiment, it is possible to reduce discomfort associated with the closed automatic window and external light shielding device 23.

Embodiment 6

The control apparatus 3 according to Embodiment 6 is different from the control apparatus 3 according to Embodiment 1 in that the opening-closing control of the external light shielding device, which serves as the passive devices 2, differs depending on time in the wintertime. The constituent elements same as those of the control apparatus 3 according to Embodiment 1 are assigned with the same reference numerals and the explanation thereof is herein omitted.

The device control unit 35 of the present embodiment performs opening-closing control of the external light shielding device according to the time slot in the wintertime. The explanation of functions same as those of the device control unit 35 of Embodiment 1 is herein omitted.

In the daytime, the device control unit 35 performs the opening control of the external light shielding device in order to take in more daylight and increase the room temperature. Meanwhile, in the nighttime, the device control unit 35 performs the closing control of the external light shielding device in order to prevent radiation cooling. Further, the device control unit 35 changes the control timing according to the orientation of room, for example, by delaying the closing control of the external light shielding devices in the west-facing rooms and accelerating the closing control of the external light shielding devices in the north-facing rooms, instead of simultaneously controlling the external light shielding devices in all of the rooms.

It is preferred that the passive device 2 be an external light shielding device installed in an opening of the building, and the device control unit 35 perform opening-closing control corresponding to a time slot on the external light shielding device in the wintertime, as in the control apparatus 3 of the above-described present embodiment.

With the control apparatus 3 of the present embodiment, a room temperature increase effect can be expected to be obtained in the wintertime. As a result, a low threshold can be set and, therefore, energy consumption can be further reduced.

Embodiment 7

The control apparatus 3 according to Embodiment 7 is different from the control apparatus 3 according to Embodiment 1 in that where the user causes the passive device 2 to act a specified number of times or more, against the passive control within a predetermined period of time during the passive control, this operation is considered to be everyday activity and the time slot in which the operation is performed is assumed to be uncontrolled. The constituent elements same as those of the control apparatus 3 according to Embodiment 1 are assigned with the same reference numerals and the explanation thereof is herein omitted.

Where the passive device 2 performs an operation, which is different from control contents of the passive control, a second specified number of times or more, within a second predetermined period of time when the passive control is performed, the device control unit 35 of the present embodiments stops the control of the passive device 2 with the control contents in a time slot in which the different operation has been performed. Thus, the device control unit 35 does not implement the control contents in the time slot in which the different control is performed. The explanation of functions same as those of the device control unit 35 of Embodiment 1 is herein omitted.

Figure 18:
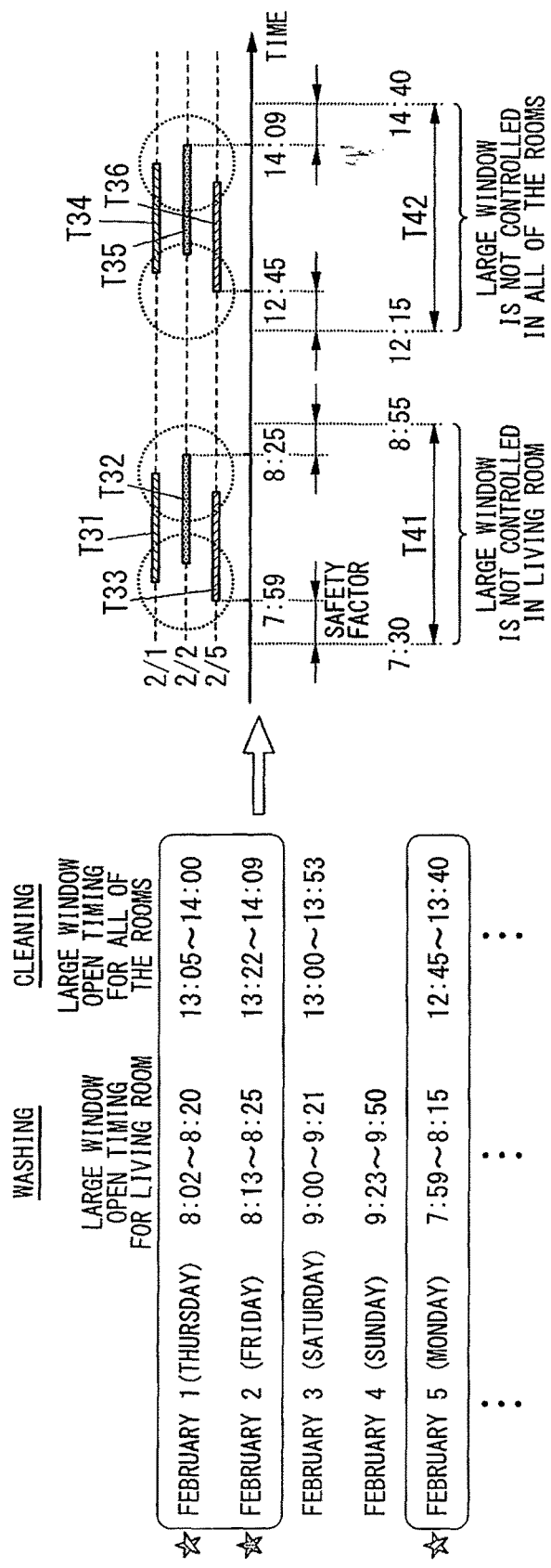
FIG. 18 is an explanatory drawing of the operation of the control apparatus according to Embodiment 7.

Let us assume that the user opens a large window serving as the passive device 2 in a time slot shown in FIG. 18 for washing or cleaning, for example, every day from February 1 (Thursday) to February 5 (Monday) (originally, the period of closing control). Where such an operation is performed a specified number of times or more, within a predetermined period and the deviation of the timing at which the large window is opened and the deviation of the timing at which the large window is closed are within respective predetermined periods of time, such activity is considered to be everyday activity. As depicted in FIG. 18, the device control unit 35 determines a time slot T41 in which the everyday activity is performed with consideration for a safety factor from daily time zones T31 to T33, and determines a time slot T42 in which the everyday activity is performed with consideration for a safety factor from daily time zones T34 to T36. The time slot T41 (7:30 to 8:55) is determined by adding a safety factor, that is, a predetermined interval of time (about 30 min), to a timing before the earliest start timing (7:59) and to a timing after the latest end timing (8:25) among the time slot T31 (8:02 to 8:20), time slot T32 (8:13 to 8:25), and time slot T33 (7:59 to 8:15). The time slot T42 (12:15 to 14:40) is determined by adding a safety factor, that is, a predetermined interval of time (about 30 min), to a timing before the earliest start timing (12:45) and to a timing after the latest end timing (14:09) among the time slot T34 (13:05 to 14:00), time slot T35 (13:22 to 14:09), and time slot T36 (12:45 to 13:40). The device control unit 35 does not control the passive device 2 which is a control object (in this case, the large window) in the time slots T41 and T42 in which the daily activity is performed.

It is preferred that the device control unit 35 perform the following operations, as in the control apparatus 3 of the above-described present embodiment. Where the passive device 2 performs an operation, which is different from the control contents of the first control, a second specified number of times or more, within a second predetermined period of time when the first control is performed, the device control unit 35 stops the control of the passive device 2 with the control contents in a time slot in which the different operation has been performed.

As mentioned hereinabove, where the passive device 2 performs an operation, which is different from the control contents of the passive control, a second specified number of times or more, within a second predetermined period of time, the control apparatus 3 of the present embodiment stops the control of the passive device 2 with the control contents in a time slot in which the different operation has been performed. As a result, with the control apparatus 3 of the present embodiment, it is possible to reduce discomfort associated with unintended control by learning the activity (operations) of people in the target space.

Embodiment 8

The control apparatus 3 according to Embodiment 8 is different from the control apparatus 3 according to Embodiment 1 in that an operation different from the passive control is allowed for the passive device 2 only within a predetermined period of time. The constituent elements same as those of the control apparatus 3 according to Embodiment 1 are assigned with the same reference numerals and the explanation thereof is herein omitted.

Where the passive device 2 performs an operation, which is different from control contents of the passive control, when the passive control is performed, the device control unit 35 of the present embodiment performs return control for returning to the operation with the control contents after a return time elapses since the different operation has been performed. Further, where the passive device 2 performs the different operation a third specified number of times or more, within a third predetermined period of time, the device control unit 35 sets the return time such as to include a time slot in which the different operation has been performed. The explanation of functions same as those of the device control unit 35 of Embodiment 1 is herein omitted.

Where the user causes the passive device 2 to perform an operation against the passive control during the implementation of the passive control, a return to the passive control takes place after a predetermined return time elapses. Where the return time is not accepted by the user (when an operation against the control is performed again a predetermined number of times within a predetermined period of time after the return to the passive control), the return time is changed.

For example, let us assume that the user opens the large window during the passive control in the wintertime (originally, the closing control is performed). Where the user forgets to close the large window, the device control unit 35 automatically closes the large window after a return time elapses (return to passive control).

Where the user again acts to open the large window the predetermined number of times within the predetermined period of time after the return to the passive control, the return time is extended.

The device control unit 35 preferably performs the following operations, as in the control apparatus 3 of the above-described present embodiment. Where the passive device 2 performs an operation, which is different from the control contents of the first control, when the first control is performed, the device control unit 35 performs return control for returning to the operation with the control contents after a return time elapses since the different operation has been performed. Where the passive device 2 performs the different operation a third specified number of times or more, within a third predetermined period of time, the device control unit 35 sets the return time such as to include a time slot in which the different operation has been performed.

As mentioned hereinabove, where the passive device 2 performs an operation different from the control contents of the passive control, the control apparatus 3 of the present embodiment automatically returns to the operation of the passive control after the return time elapses. As a result, with the control apparatus 3 of the present embodiment, the activity (operations) of people in the target space can be learned without significant loss in energy savings, and discomfort associated with unintended control can be reduced.

The present invention is described hereinabove on the basis of several preferred embodiments thereof, but a variety of changes and modifications can be performed by a person skilled in the art, without departing from the original essence and scope of the present invention, that is from the claims.

The invention claimed is:

1. A control apparatus configured to control an active device and a passive device which change a room temperature in a target space inside a building, the control apparatus comprising:
    an outside air temperature acquisition circuit configured to acquire outside air temperature information indicating an outside air temperature outside the building;
    a threshold setting circuit configured to set an outside air temperature threshold;
    a comparison circuit configured to compare the outside air temperature in the outside air temperature information acquired by the outside air temperature acquisition circuit with the outside air temperature threshold that has been set by the threshold setting circuit;
    a device control circuit configured to selectively perform, based on a comparison result of the comparison circuit, first control by which OFF control is performed on the active device and natural environment usage control which changes the room temperature by using at least one of outside air and external light is performed on the passive device, or second control by which ON control is performed on the active device; and
    an operation information acquisition circuit configured to acquire ON operation information indicating that an ON operation for setting ON the active device has been performed, wherein
    the device control circuit is configured to perform in at least three states including:
    a first state in which the device control circuit performs the first control when the outside air temperature is within a temperature range on a comfortable side with respect to the outside air temperature threshold,
    a second state in which the device control circuit, when the outside air temperature information indicates the outside air temperature is in a temperature range on an uncomfortable side with respect to the outside air temperature threshold, performs the first control until the ON operation information is acquired by the operation information acquisition circuit and
    a third state in which the device control circuit performs the second control upon acquisition of the ON operation information by the operation information acquisition circuit,
    the ON operation information corresponding to an ON operation performed by a user with respect to the active device.

2. The control apparatus according to claim 1, wherein the threshold setting circuit is configured to set the outside air temperature threshold based on an environment evaluation value including at least one of a thermal insulation evaluation value, a light utilization evaluation value, and a ventilation evaluation value relating to the building.

3. The control apparatus according to claim 2, wherein the threshold setting circuit is configured to determine the environment evaluation value by using at least one of a heat loss coefficient and an equivalent gap surface area of the building, and sets the outside air temperature threshold based on the environment evaluation value.

4. The control apparatus according to claim 2, wherein the threshold setting circuit is configured to determine the environment evaluation value by using a ratio of a surface area of an opening to a surface area of an outer wall in the building, and set the outside air temperature threshold based on the environment evaluation value.

5. The control apparatus according to claim 2, wherein when the outside air temperature reaches the temperature range on the comfortable side with respect to the outside air temperature threshold while the second control is performed, the device control circuit is configured to switch from the second control to the first control with a time delay determined according to the environment evaluation value.

6. The control apparatus according to claim 1, wherein when the ON operation is performed while the first control is performed, the device control circuit is configured to switch from the first control to the second control, and return to the first control after a predetermined time elapses since the second control has been started.

7. The control apparatus according to claim 1, wherein the threshold setting circuit is configured to reset the outside air temperature threshold to a temperature on a comfortable side when the ON operation is performed a first specified number of times or more, in a first predetermined period of time while the first control is performed.

8. The control apparatus according to claim 1, wherein
the passive device is an automatic window and an external light shielding device installed in an opening of the building, and
the device control circuit is configured to perform opening control on the automatic window and the external light shielding device when a person is present in the target space, but performs closing control on the automatic window and the external light shielding device when a person is not present in the target space, while the first control is performed.

9. The control apparatus according to claim 1, wherein
the passive device is an external light shielding device installed in an opening of the building, and
the device control circuit is configured to perform opening-closing control corresponding to a time slot on the external light shielding device in wintertime.

10. The control apparatus according to claim 1, wherein
when the passive device performs an operation, which is different from control contents of the first control, a second specified number of times or more, within a second predetermined period of time while the first control is performed, the device control circuit is configured to stop the control of the passive device with the control contents in a time slot in which the different operation has been performed.

11. The control apparatus according to claim 1, wherein
when the passive device performs an operation, which is different from control contents of the first control, while the first control is performed,
the device control circuit is configured to perform return control for returning to the operation with the control contents after a return time elapses since the different operation has been performed, and
when the passive device performs the different operation a third specified number of times or more, within a third predetermined period of time,
the device control circuit is configured to set the return time such as to include a time slot in which the different operation has been performed.

12. The control apparatus according to claim 1, wherein
the active device is configured to change the room temperature by cooling or warming air inside the target space by using energy, and
the passive device is configured to change the room temperature by using at least one of outside air and external light.

13. The control apparatus according to claim 12, wherein
the active device is configured to change the room temperature by cooling or warming the air inside the target space such that the room temperature becomes a set temperature.

14. The control apparatus according to claim 3, wherein the threshold setting circuit is configured to determine the environment evaluation value by using a ratio of a surface area of an opening to a surface area of an outer wall in the building, and set the outside air temperature threshold based on the environment evaluation value.

15. The control apparatus according to claim 3, wherein when the outside air temperature reaches the temperature range on the comfortable side with respect to the outside air temperature threshold while the second control is performed, the device control circuit is configured to switch from the second control to the first control with a time delay determined according to the environment evaluation value.

16. The control apparatus according to claim 4, wherein when the outside air temperature reaches the temperature range on the comfortable side with respect to the outside air temperature threshold while the second control is performed, the device control circuit is configured to switch from the second control to the first control with a time delay determined according to the environment evaluation value.

17. The control apparatus according to claim 2, wherein when the ON operation is performed while the first control is performed, the device control circuit is configured to switch from the first control to the second control, and return to the first control after a predetermined time elapses since the second control has been started.

18. The control apparatus according to claim 2, wherein the threshold setting circuit is configured to reset the outside air temperature threshold to a temperature on a comfortable side when the ON operation is performed a first specified number of times or more, in a first predetermined period of time while the first control is performed.

19. The control apparatus according to claim 2, wherein
the passive device is an automatic window and an external light shielding device installed in an opening of the building, and
the device control circuit is configured to perform opening control on the automatic window and the external light shielding device when a person is present in the target space, but performs closing control on the automatic window and the external light shielding device when a person is not present in the target space, while the first control is performed.

20. A non-transitory computer-readable medium having stored therein a program that causes a computer to control an active device and a passive device which change a room temperature in a target space inside a building, the program causing the computer to function as:
an outside air temperature acquisition circuit configured to acquire outside air temperature information indicating an outside air temperature outside the building;
a threshold setting circuit configured to set an outside air temperature threshold;
a comparison circuit configured to compare the outside air temperature in the outside air temperature information acquired by the outside air temperature acquisition circuit with the outside air temperature threshold that has been set by the threshold setting circuit;
an operation information acquisition circuit configured to acquire ON operation information indicating that an ON operation for setting ON the active device has been performed; and
a device control circuit that has a function of selectively performing, based on a comparison result of the comparison circuit, first control by which OFF control is performed on the active device and natural environment usage control which changes the room temperature by using at least one of outside air and external light is performed on the passive device, or second control by which ON control is performed on the active device, the device control circuit being configured to perform in at least three states including:

a first state in which the device control circuit performs the first control when the outside air temperature is within a temperature range on a comfortable side with respect to the outside air temperature threshold, a second state in which the device control circuit, when the outside air temperature information indicates the outside air temperature is in a temperature range on an uncomfortable side with respect to the outside air temperature threshold, performs the first control until the ON operation information is acquired by the operation information acquisition circuit and a third state in which the device control circuit performs the second control upon acquisition of the ON operation information by the operation information acquisition circuit, the ON operation information corresponding to an ON operation performed by a user with respect to the active device.

* * * * *